Figure 37:
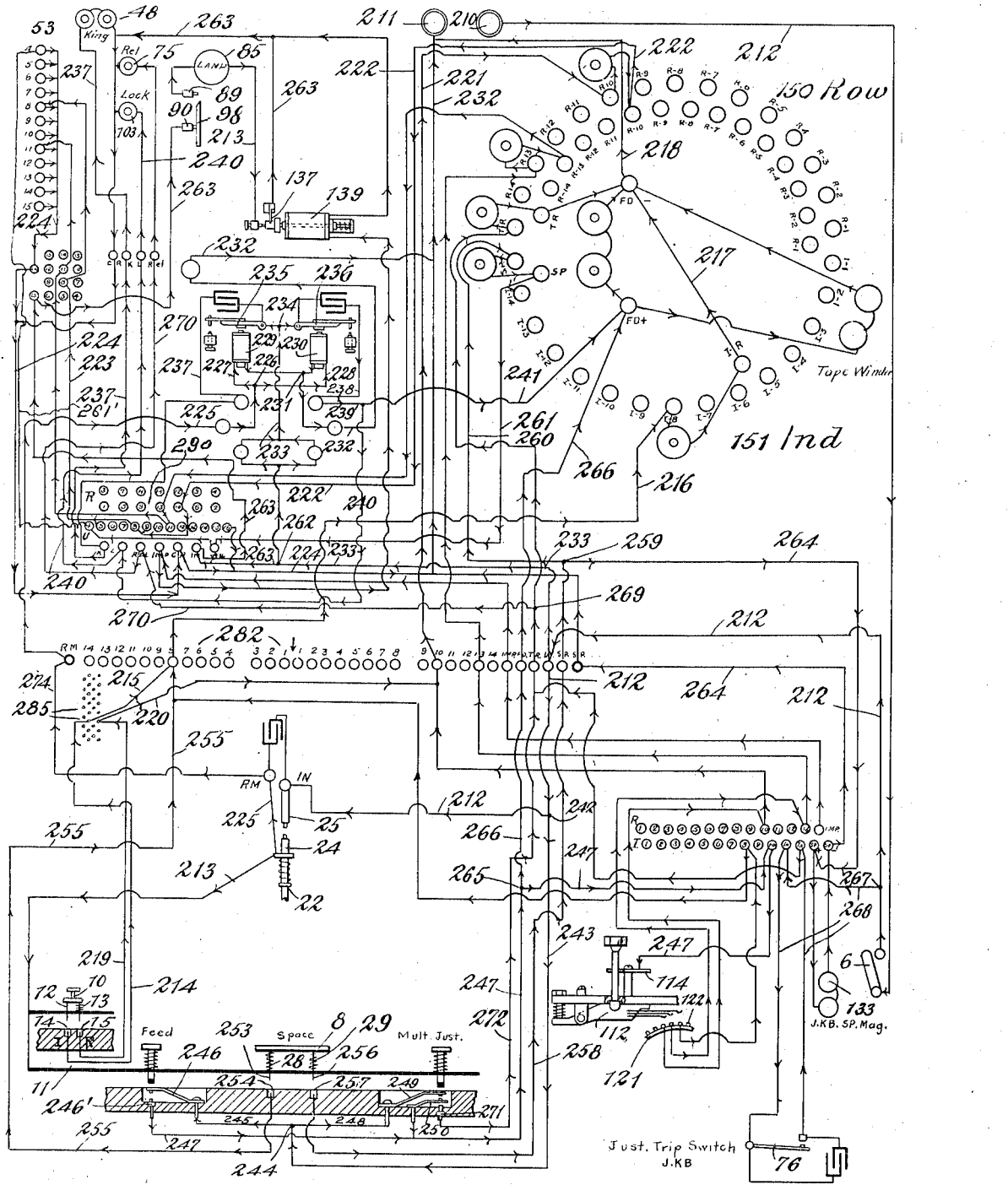

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 1.
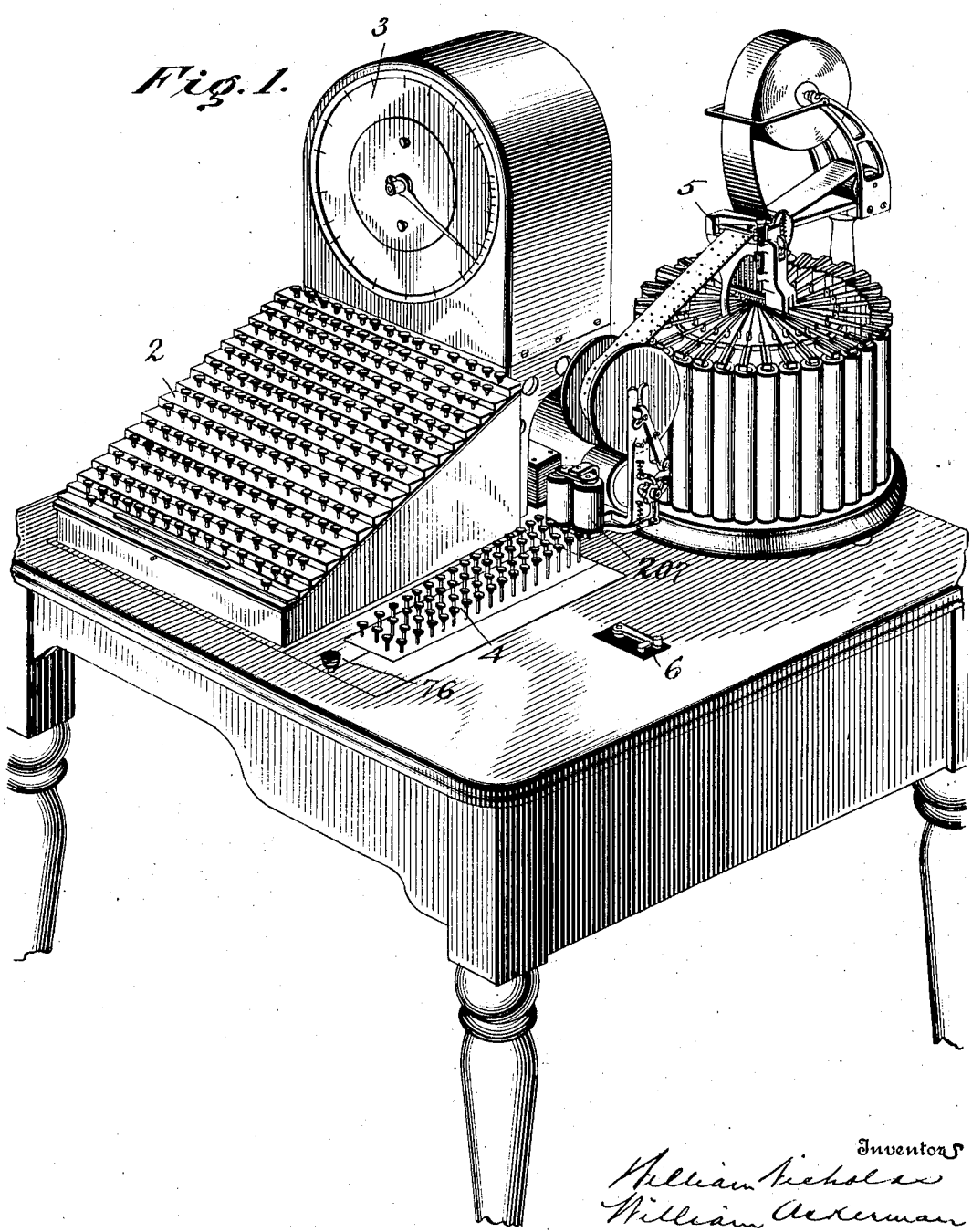

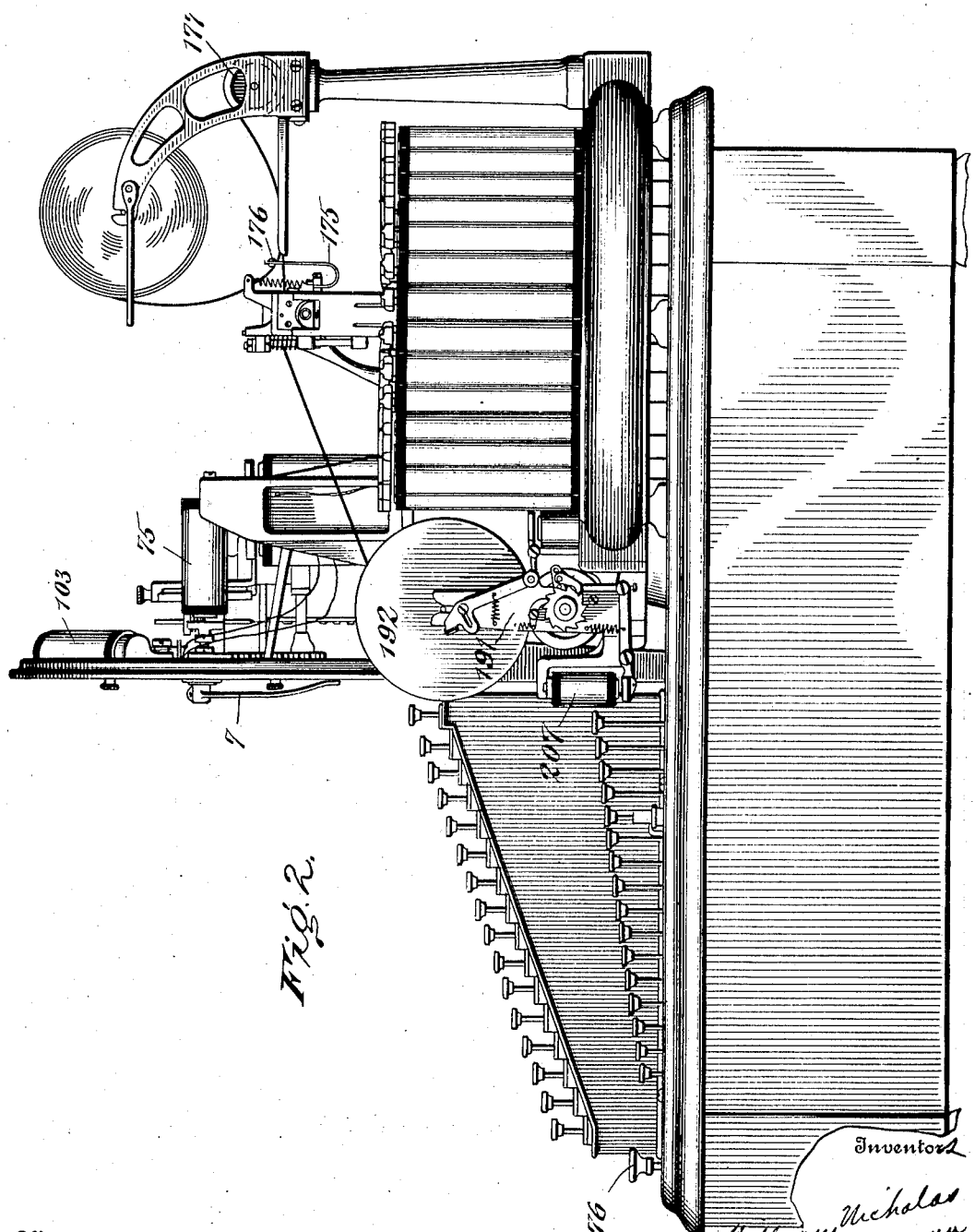

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 3.
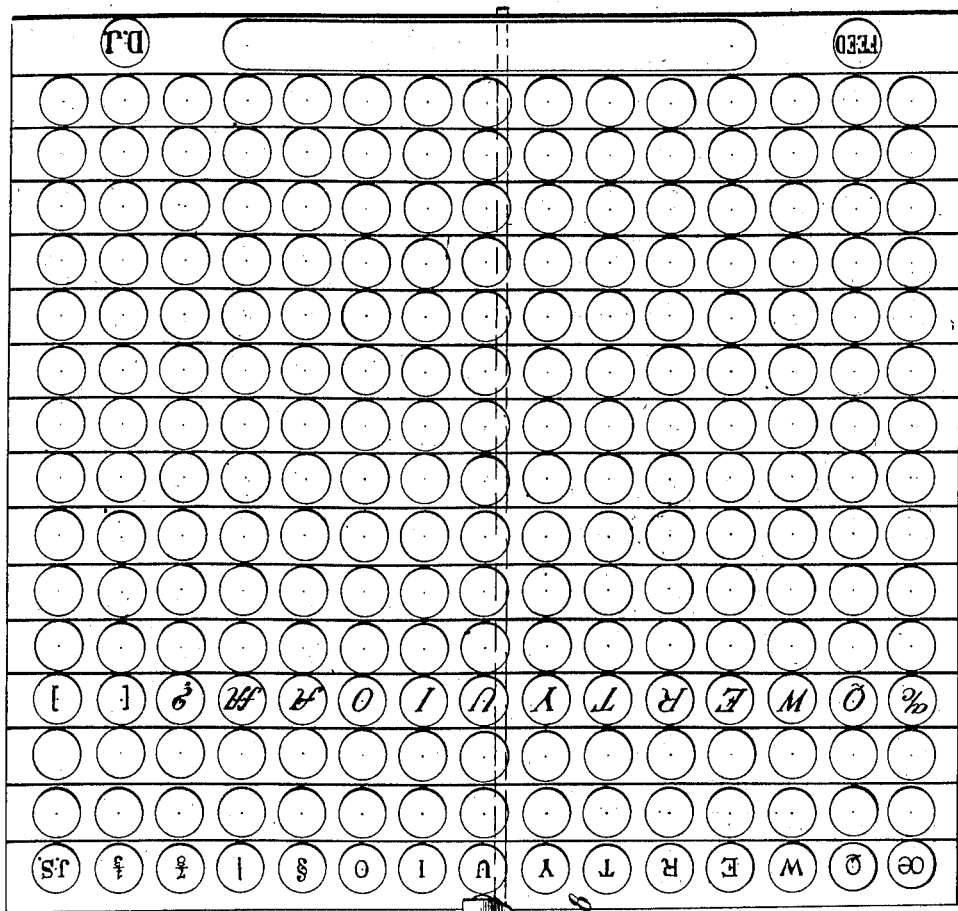
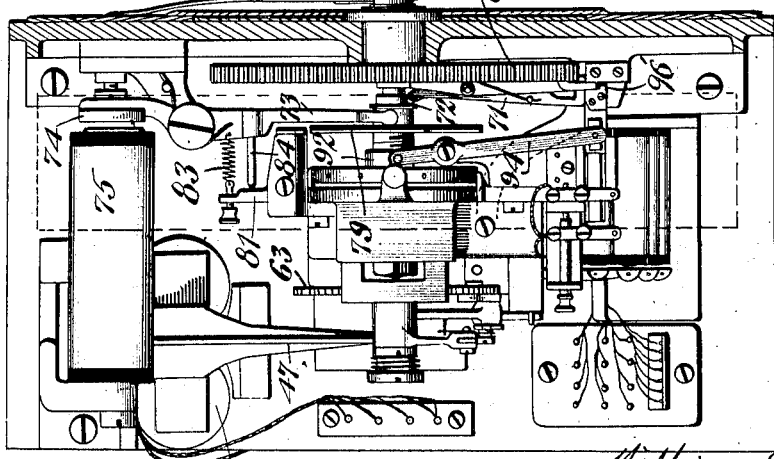

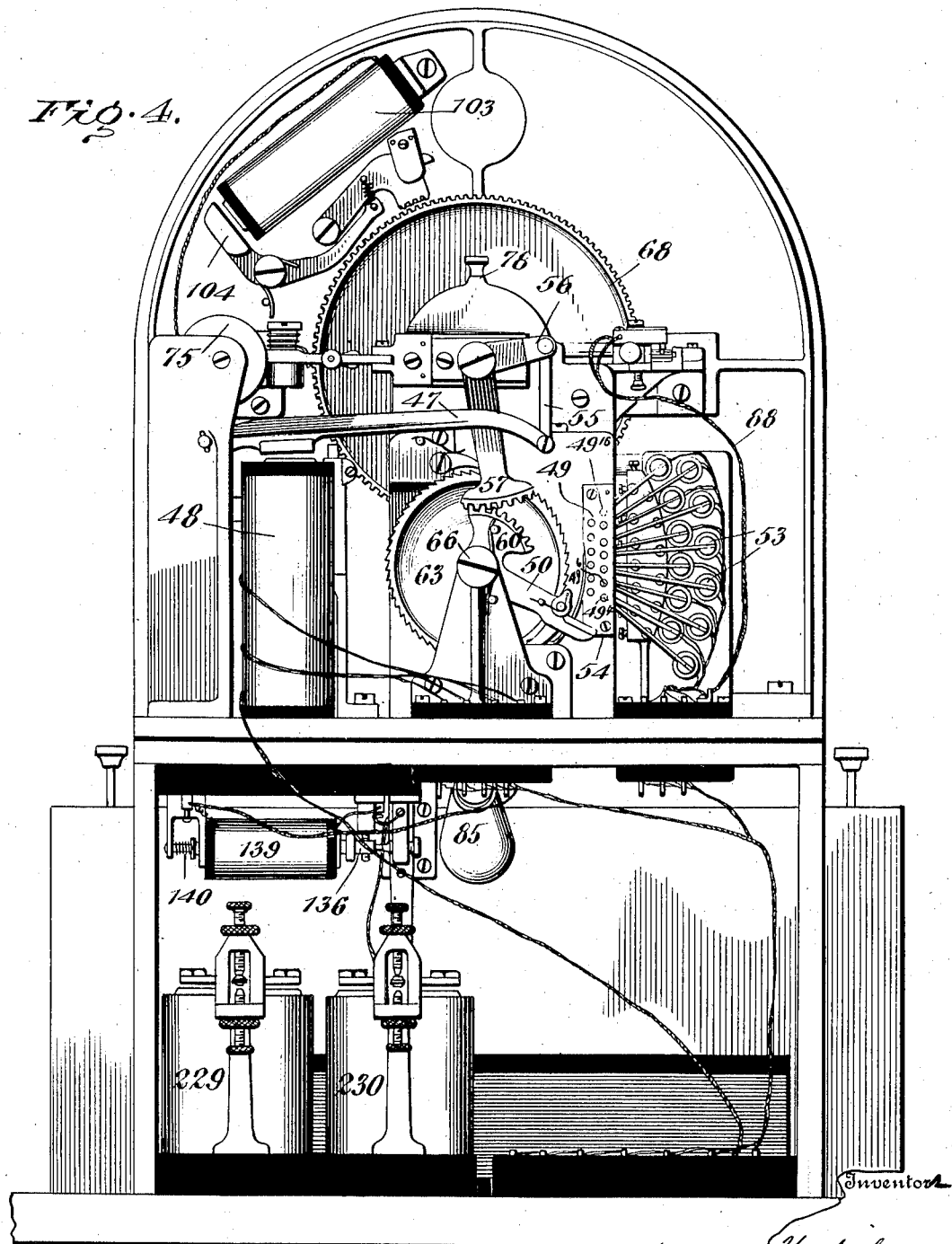

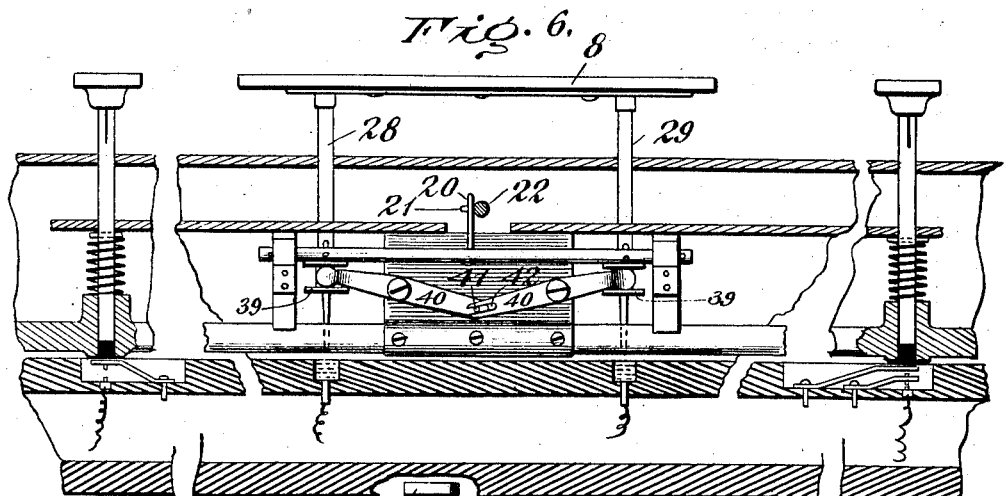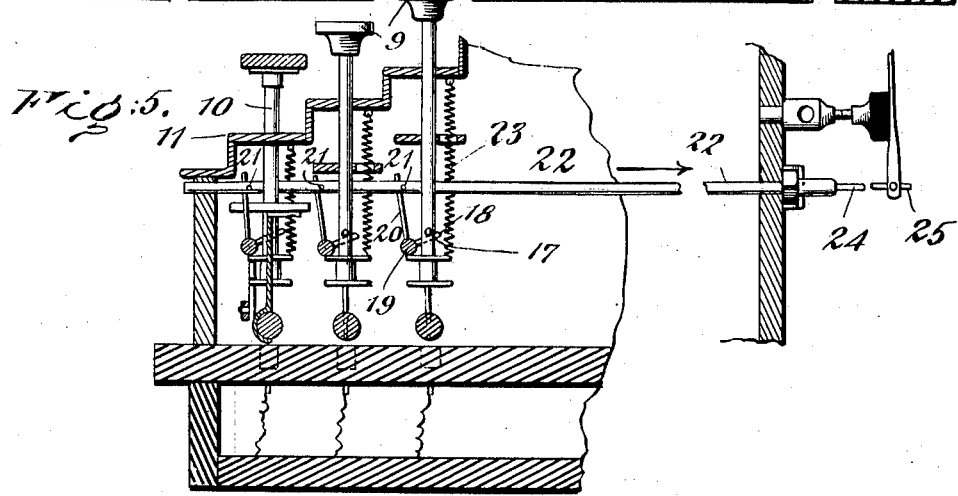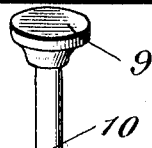

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 6.
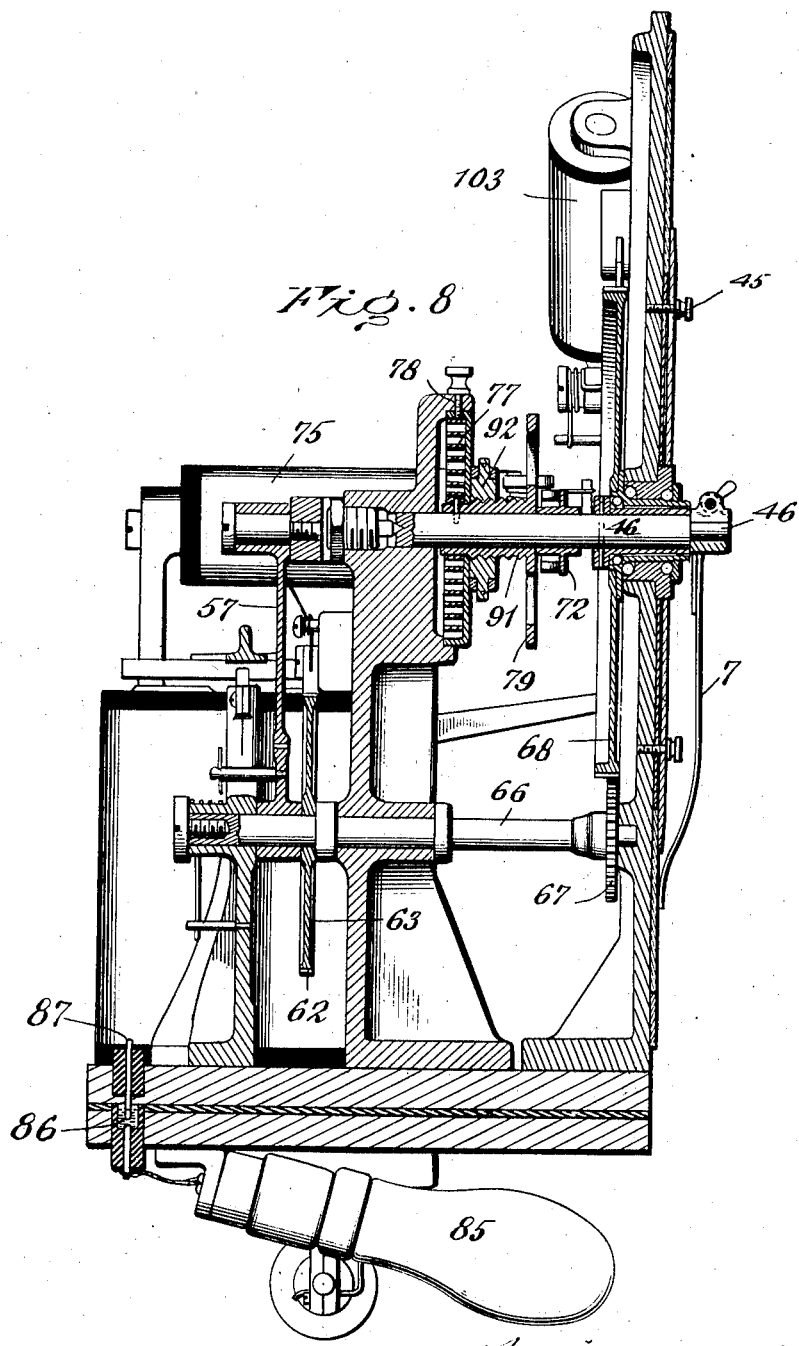

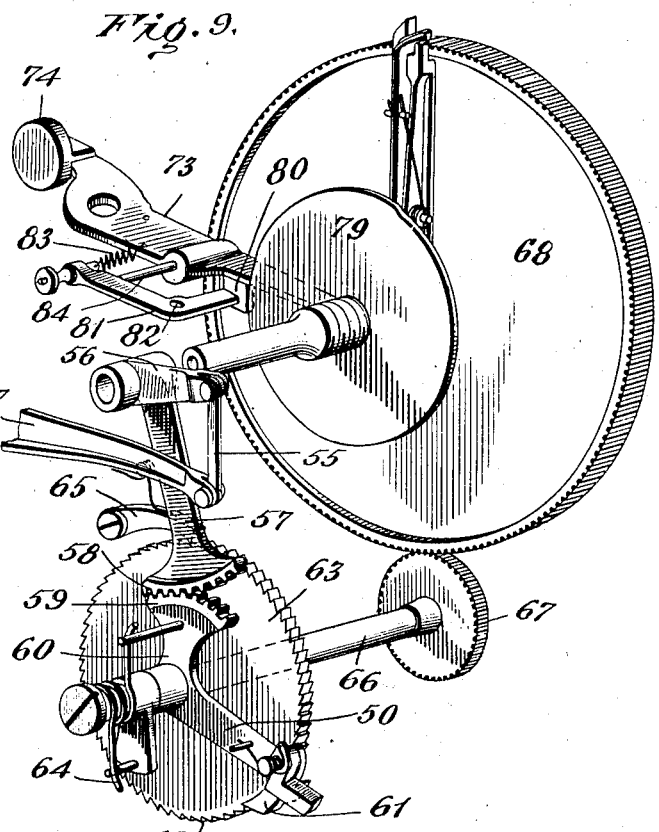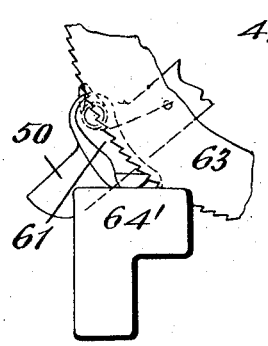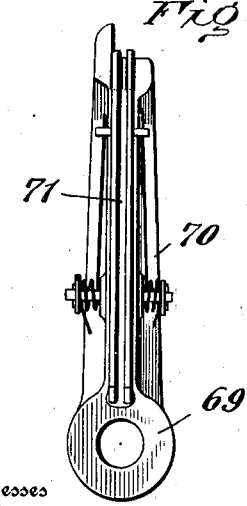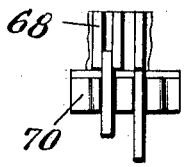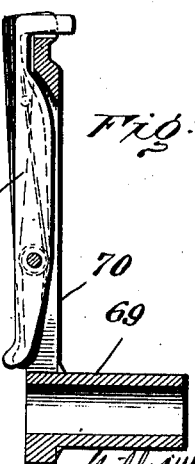

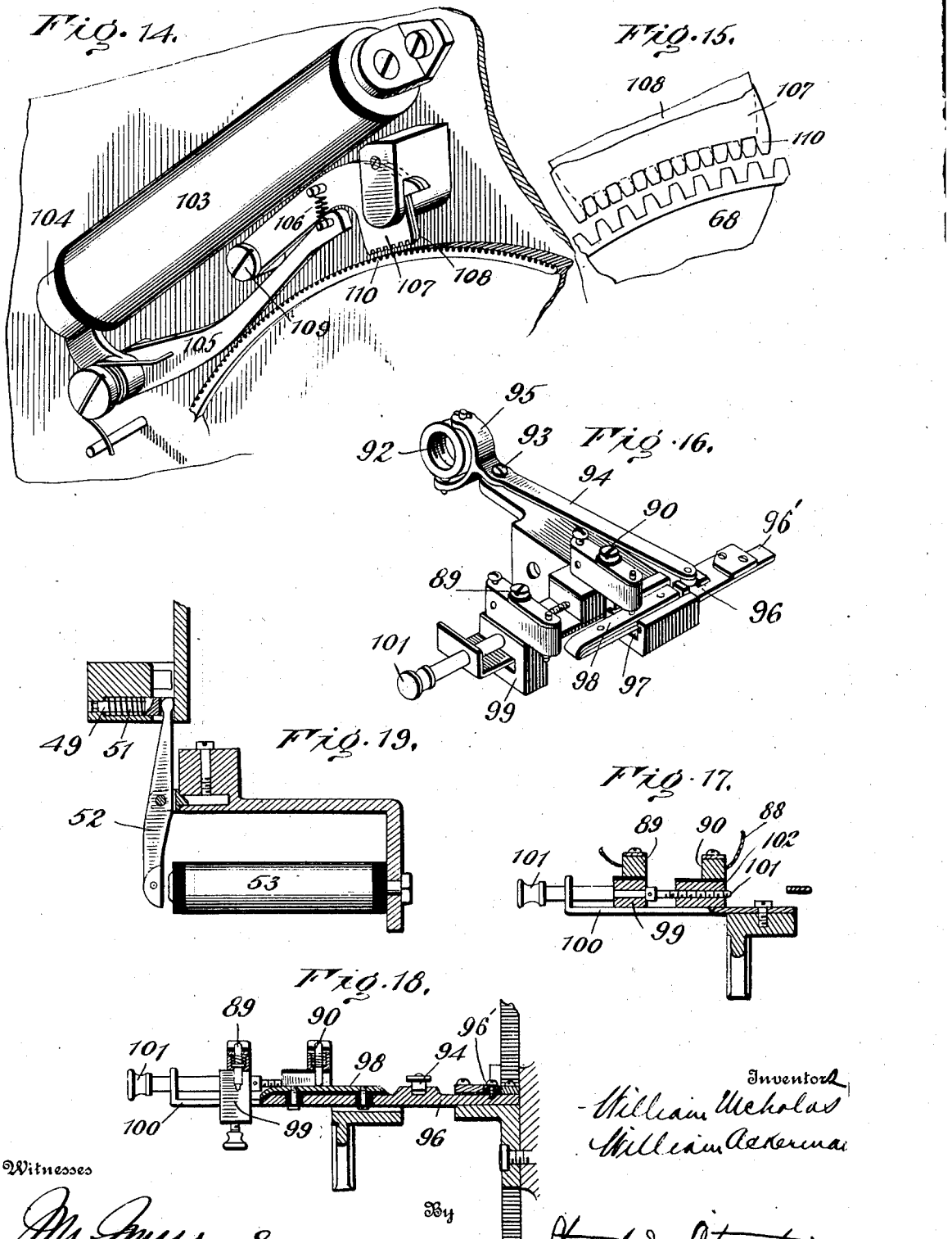

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 9.
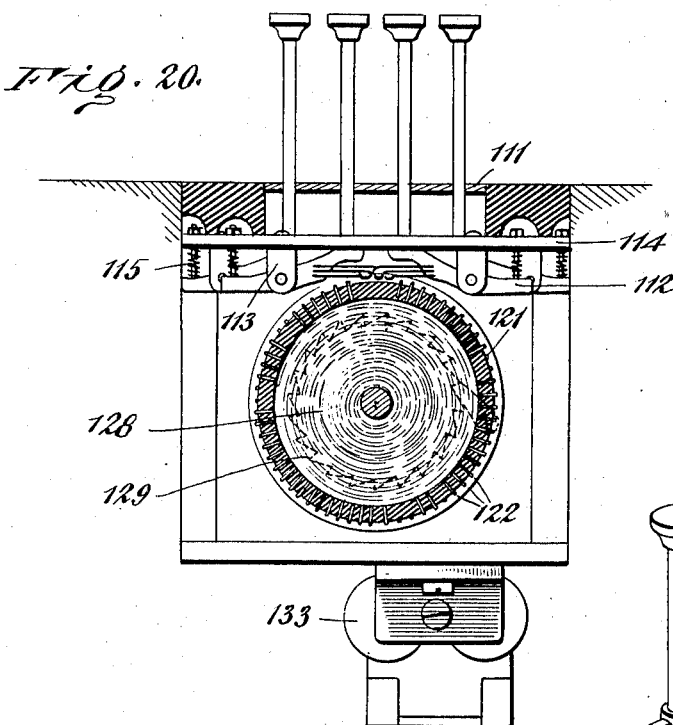
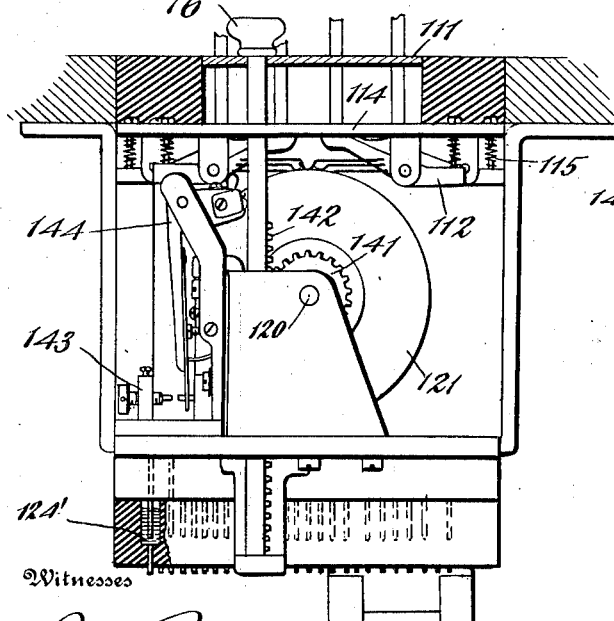
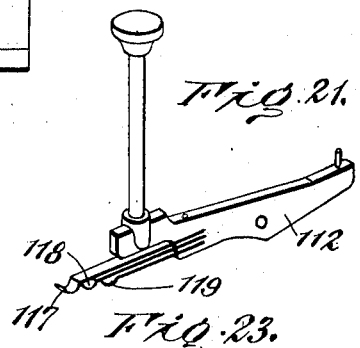
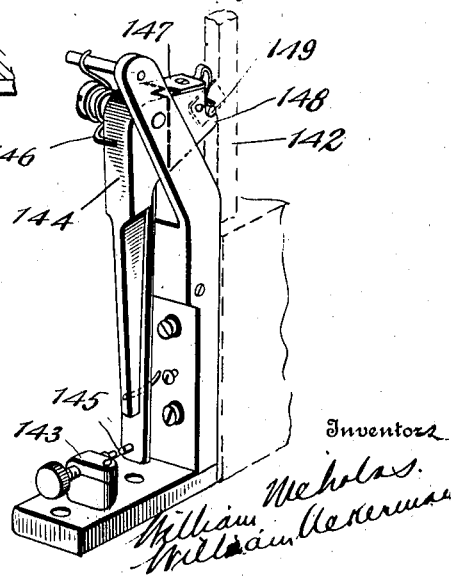

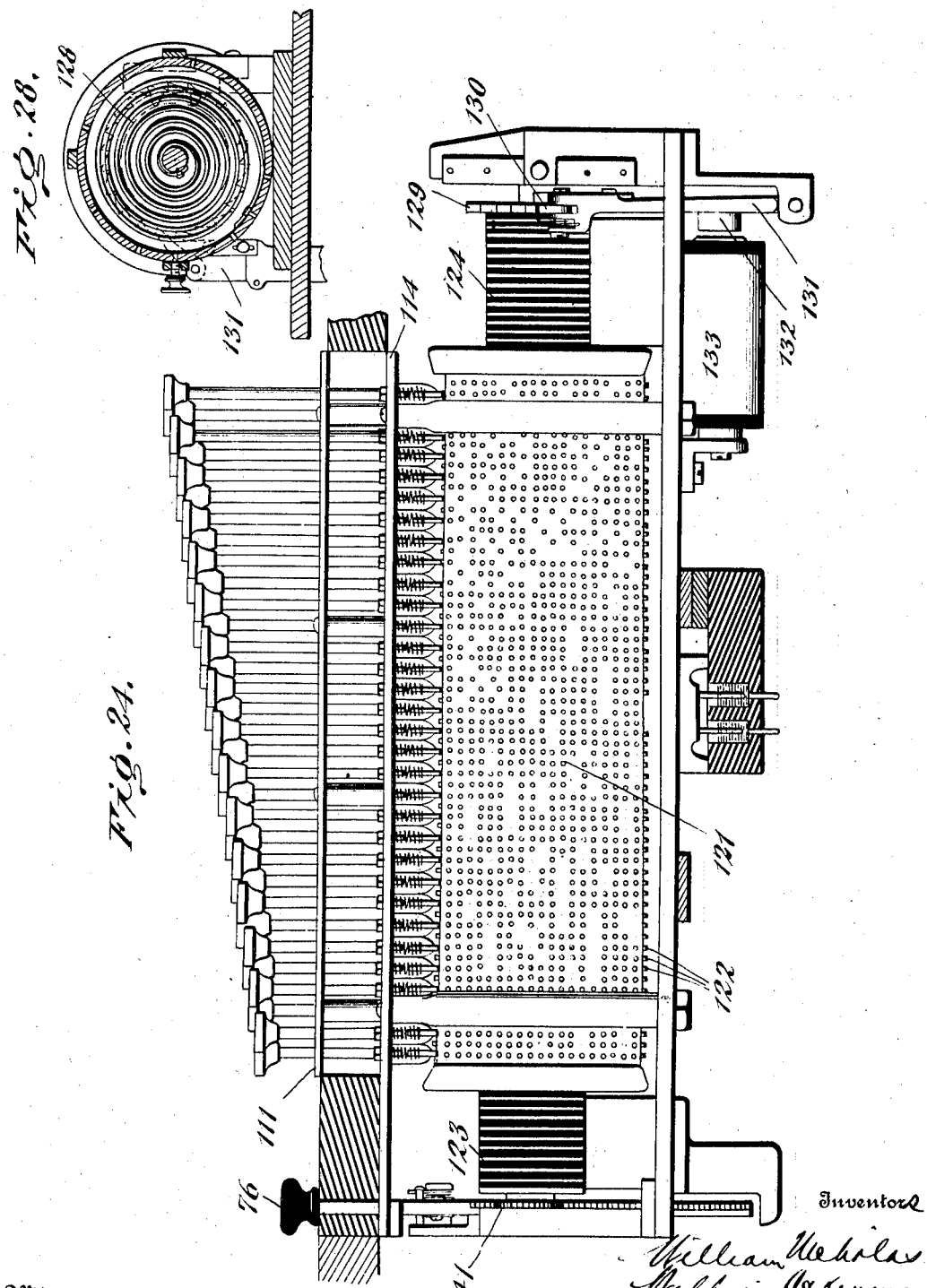

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 11.
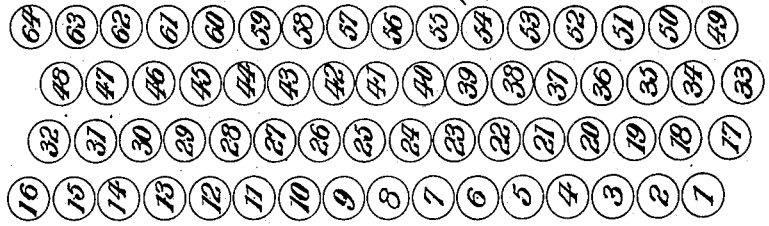
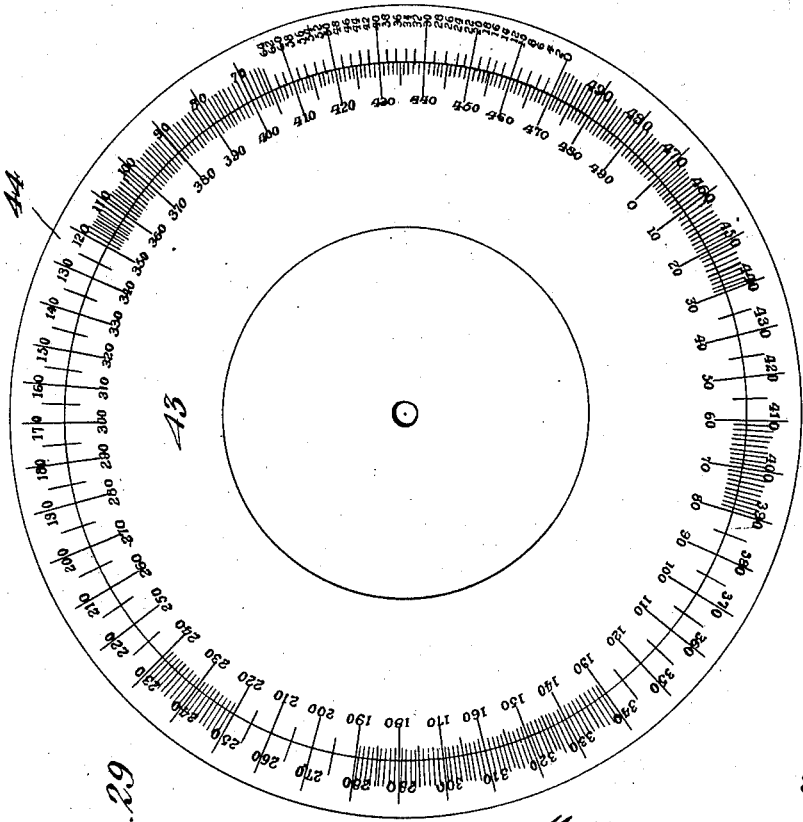

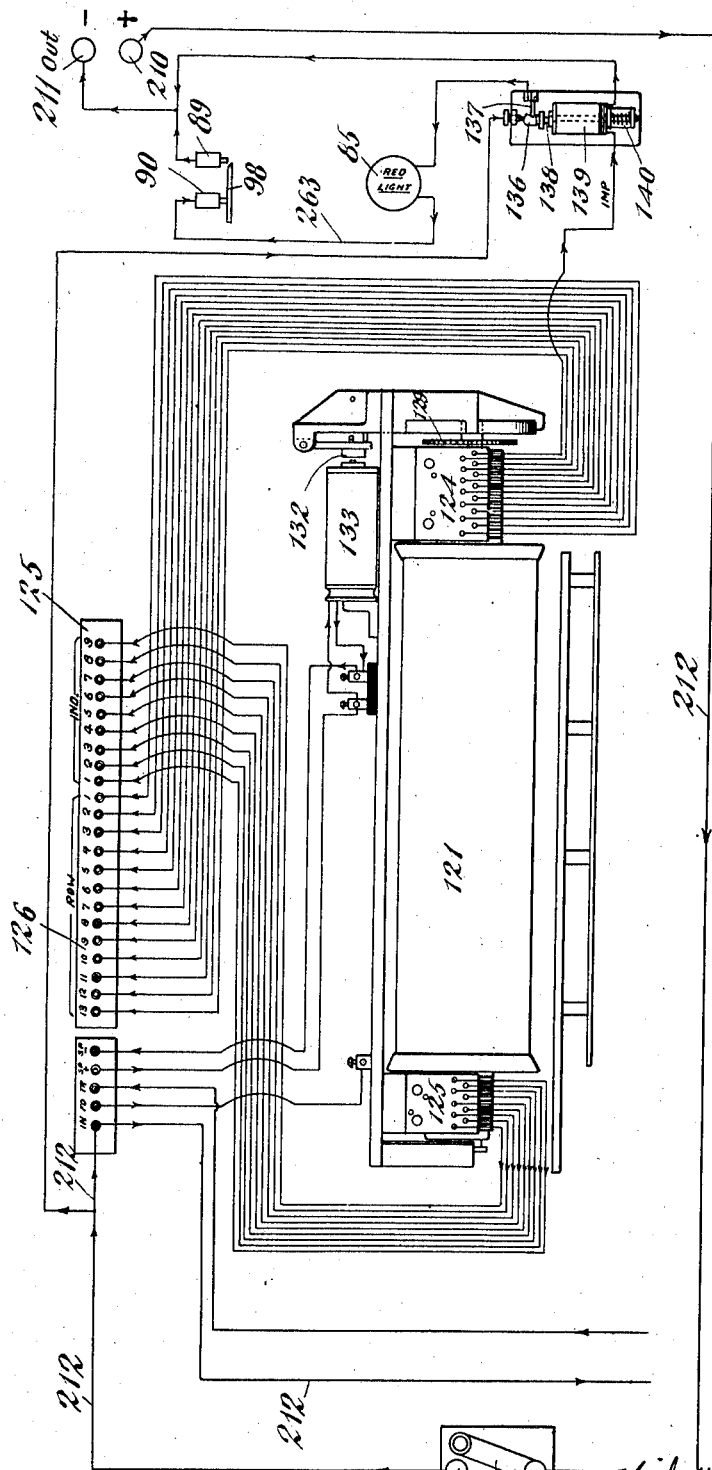

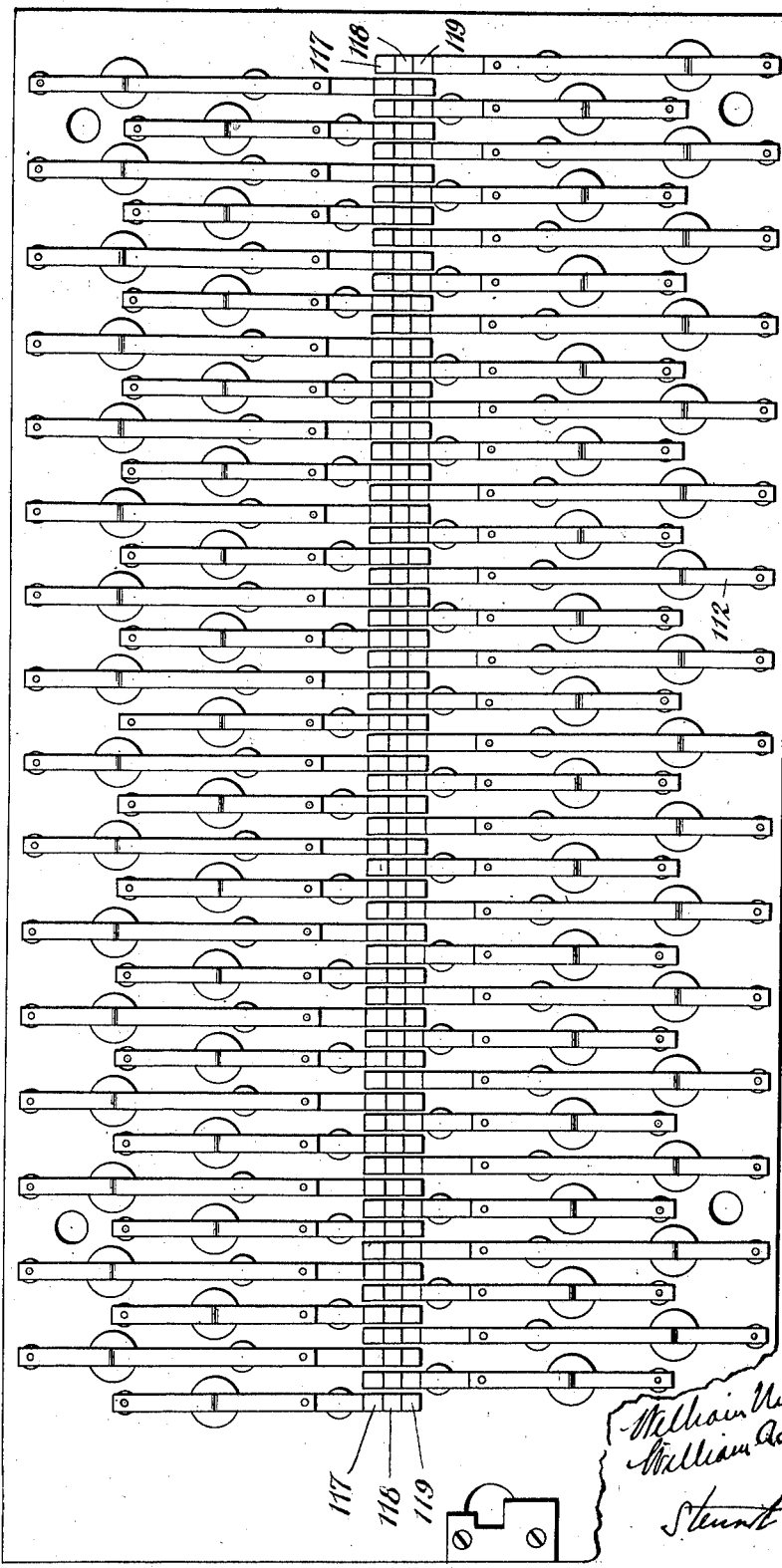

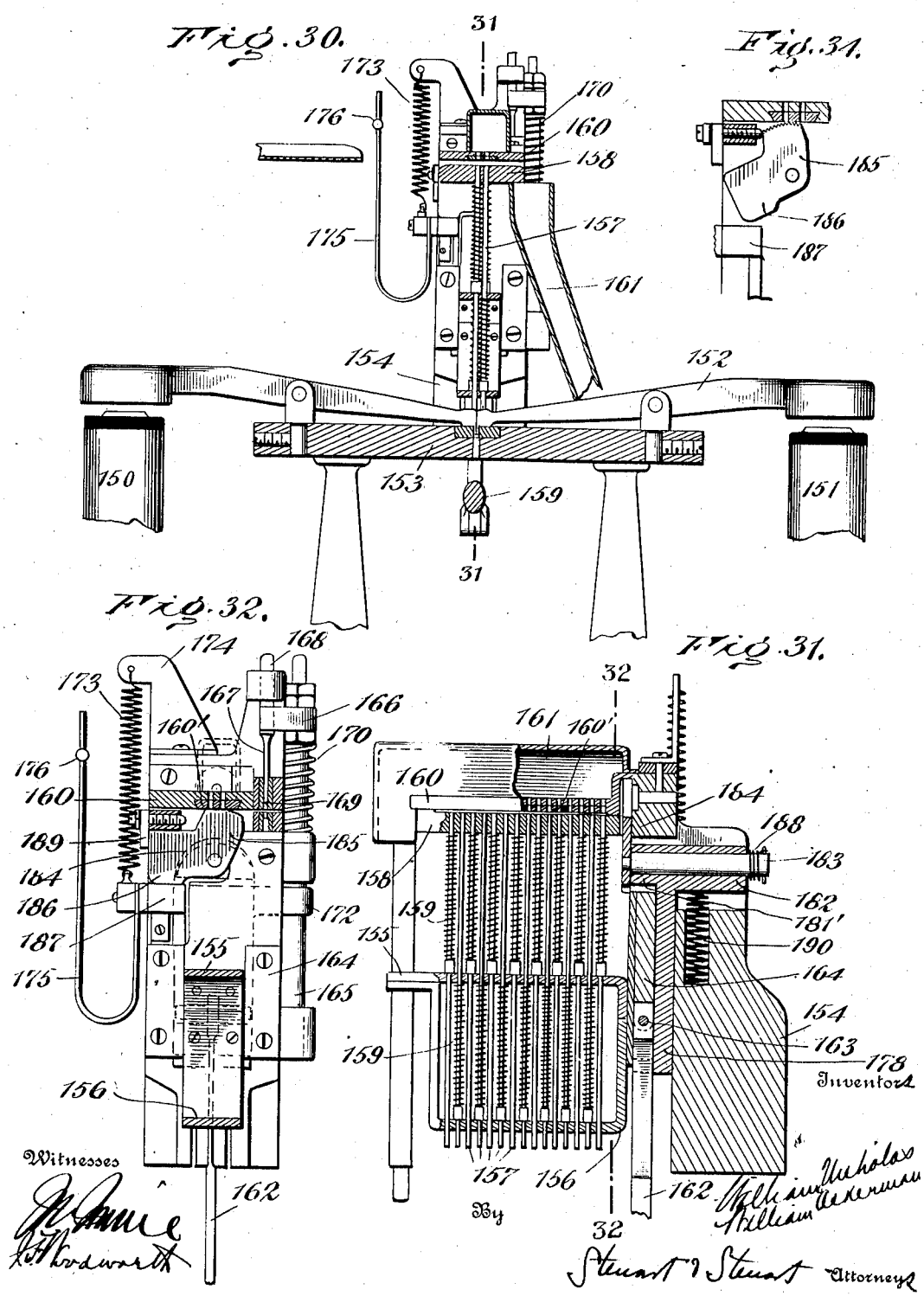

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 15.
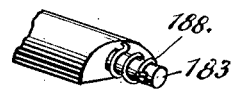
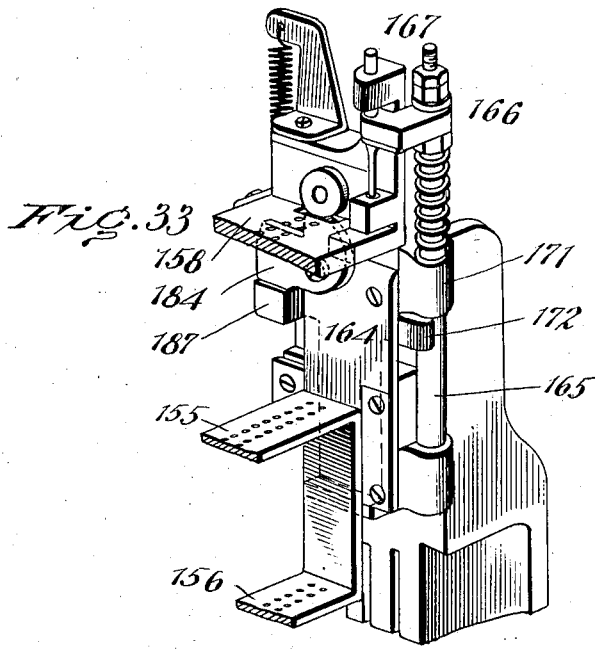

W. NICHOLAS & W. ACKERMAN.
TYPE COMPOSING MACHINE.
APPLICATION FILED FEB. 26, 1908.
964,678.
Patented July 19, 1910.
28 SHEETS—SHEET 17.
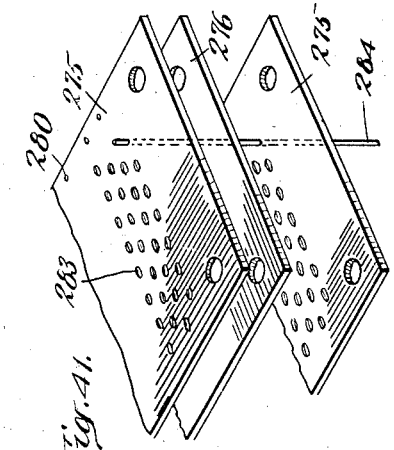
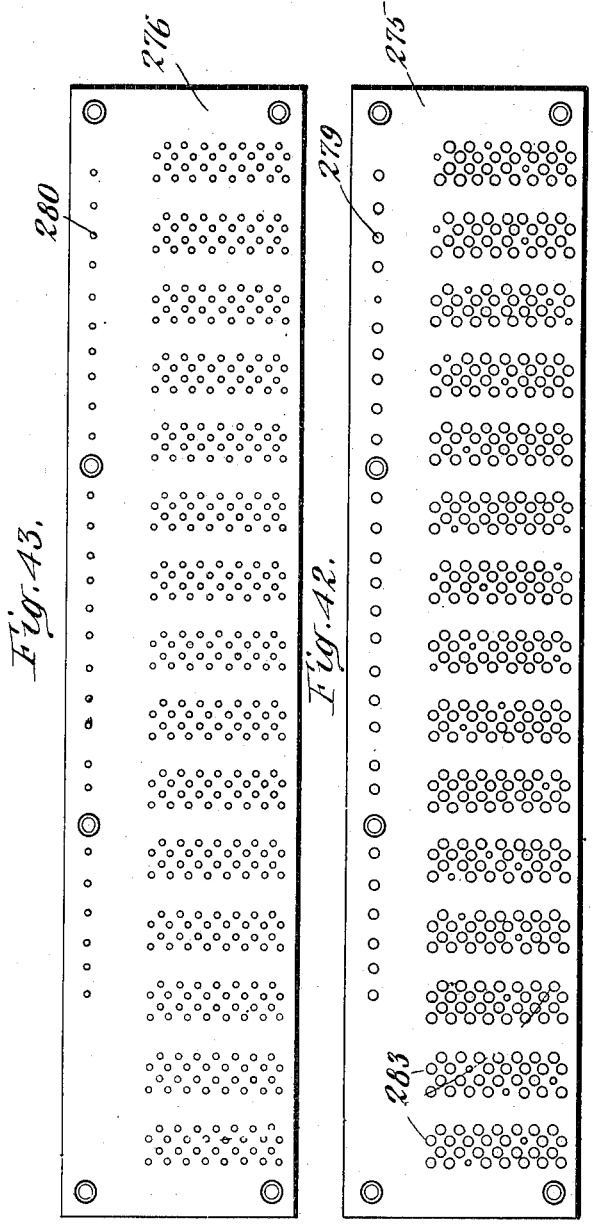
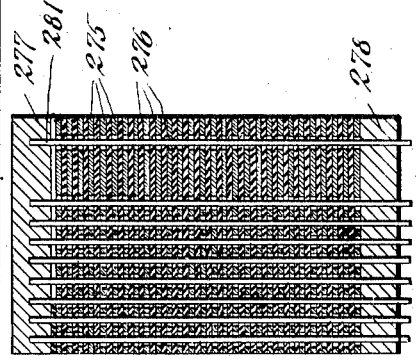

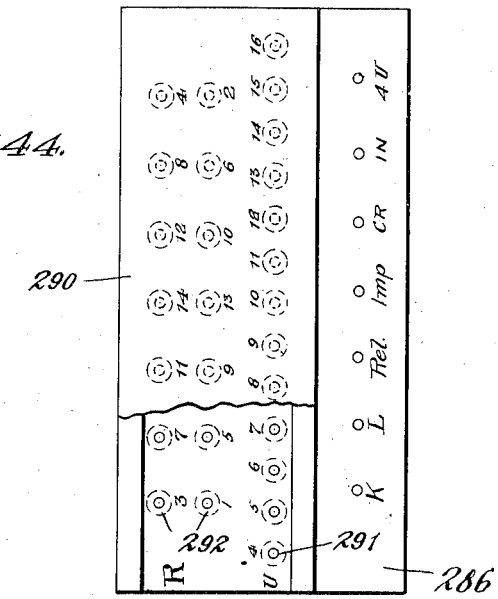
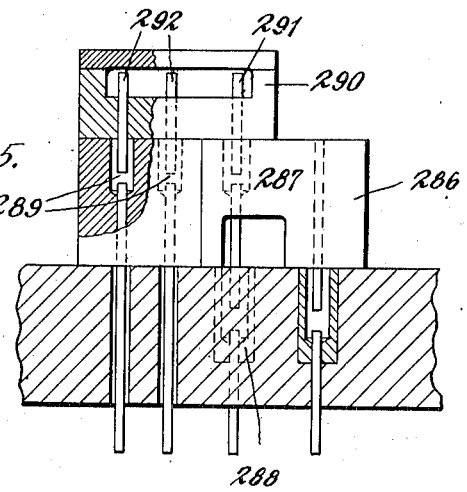

Fig. 46.

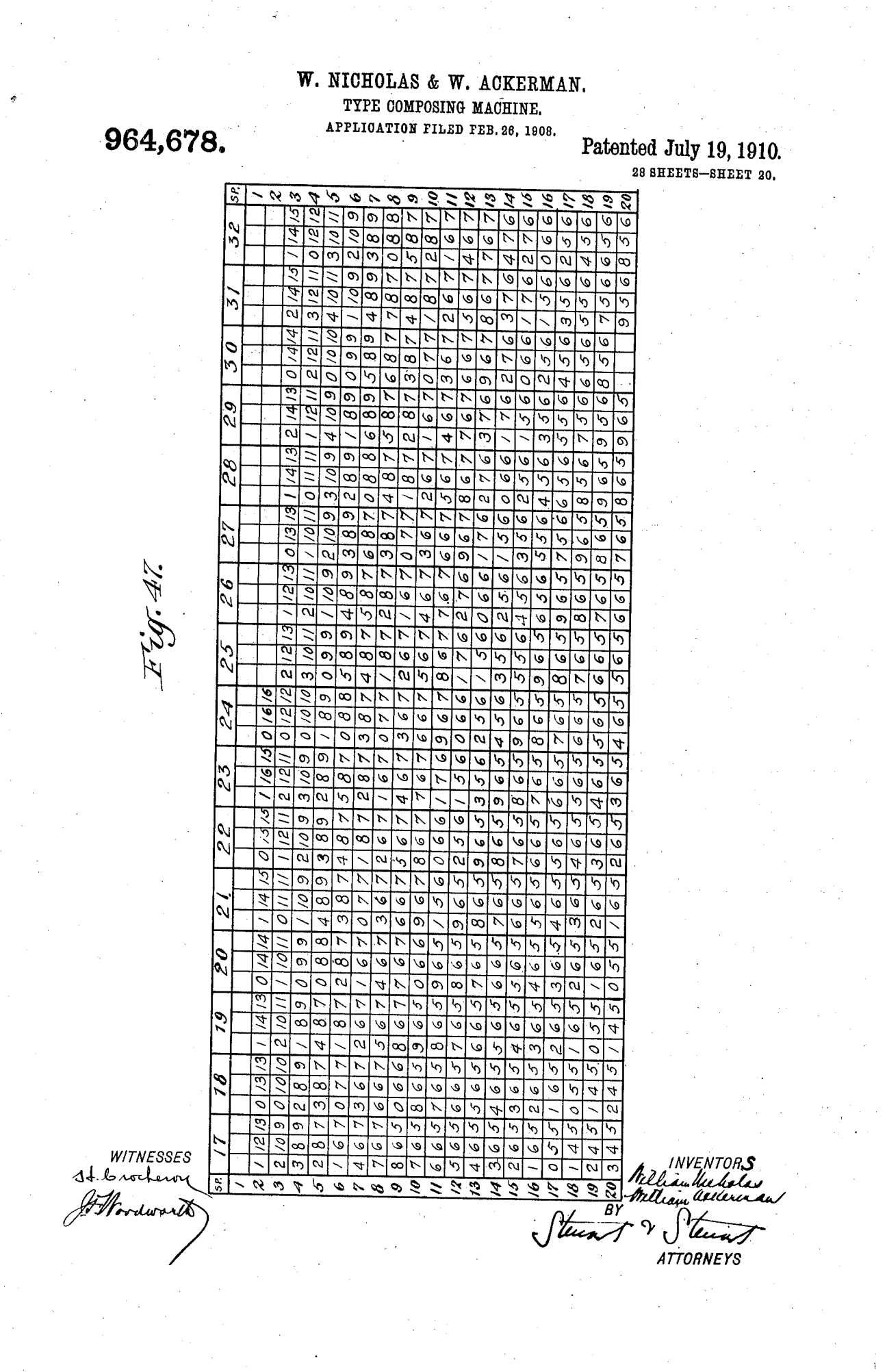

W. NICHOLAS & W. ACKERMAN.
TYPE COMPOSING MACHINE.
APPLICATION FILED FEB. 26, 1908.

964,678.

Patented July 19, 1910.
28 SHEETS—SHEET 20.

Fig. 47.

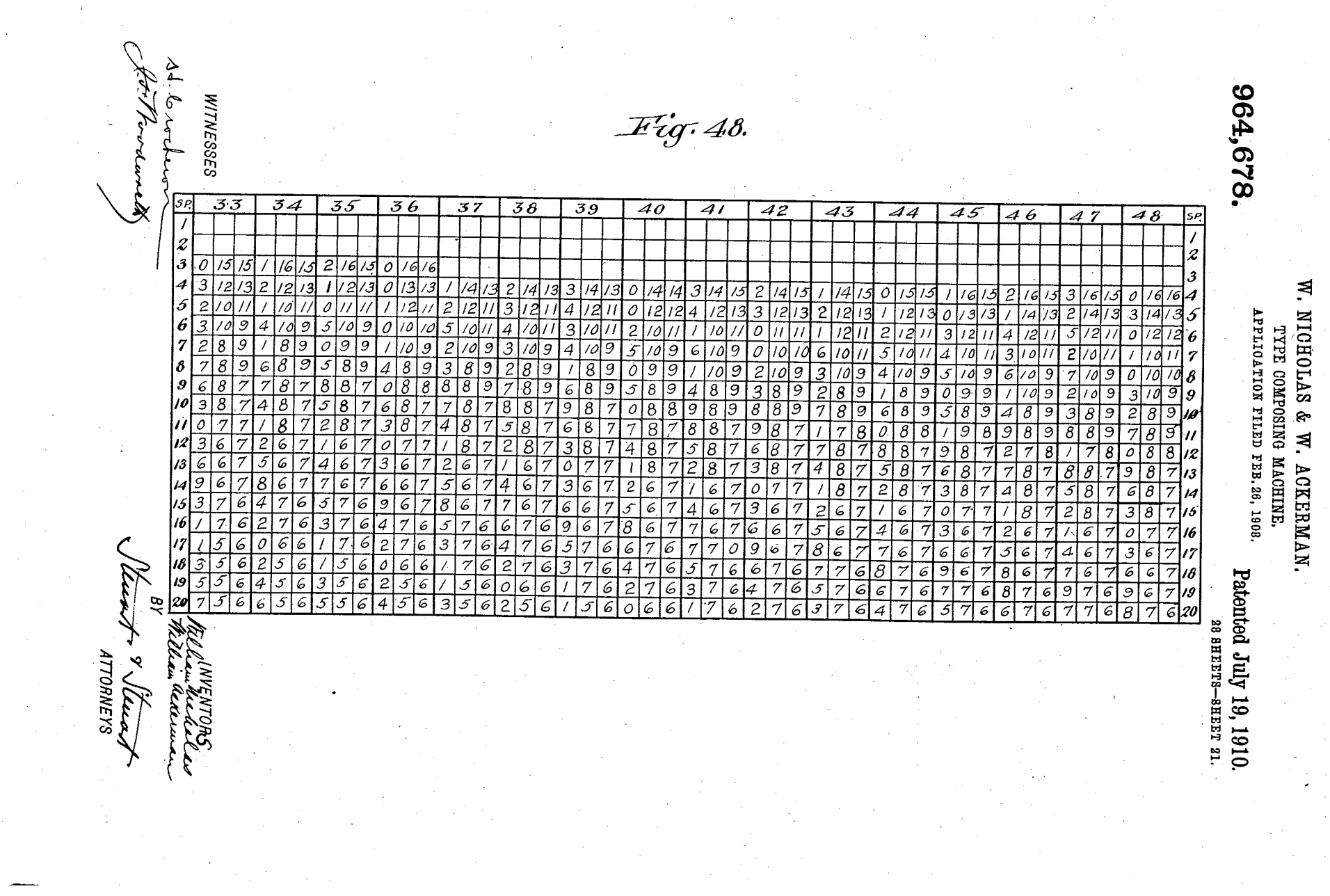

W. NICHOLAS & W. ACKERMAN.
TYPE COMPOSING MACHINE.
APPLICATION FILED FEB. 26, 1908.

964,678.

Patented July 19, 1910.
28 SHEETS—SHEET 21.

Fig. 48.

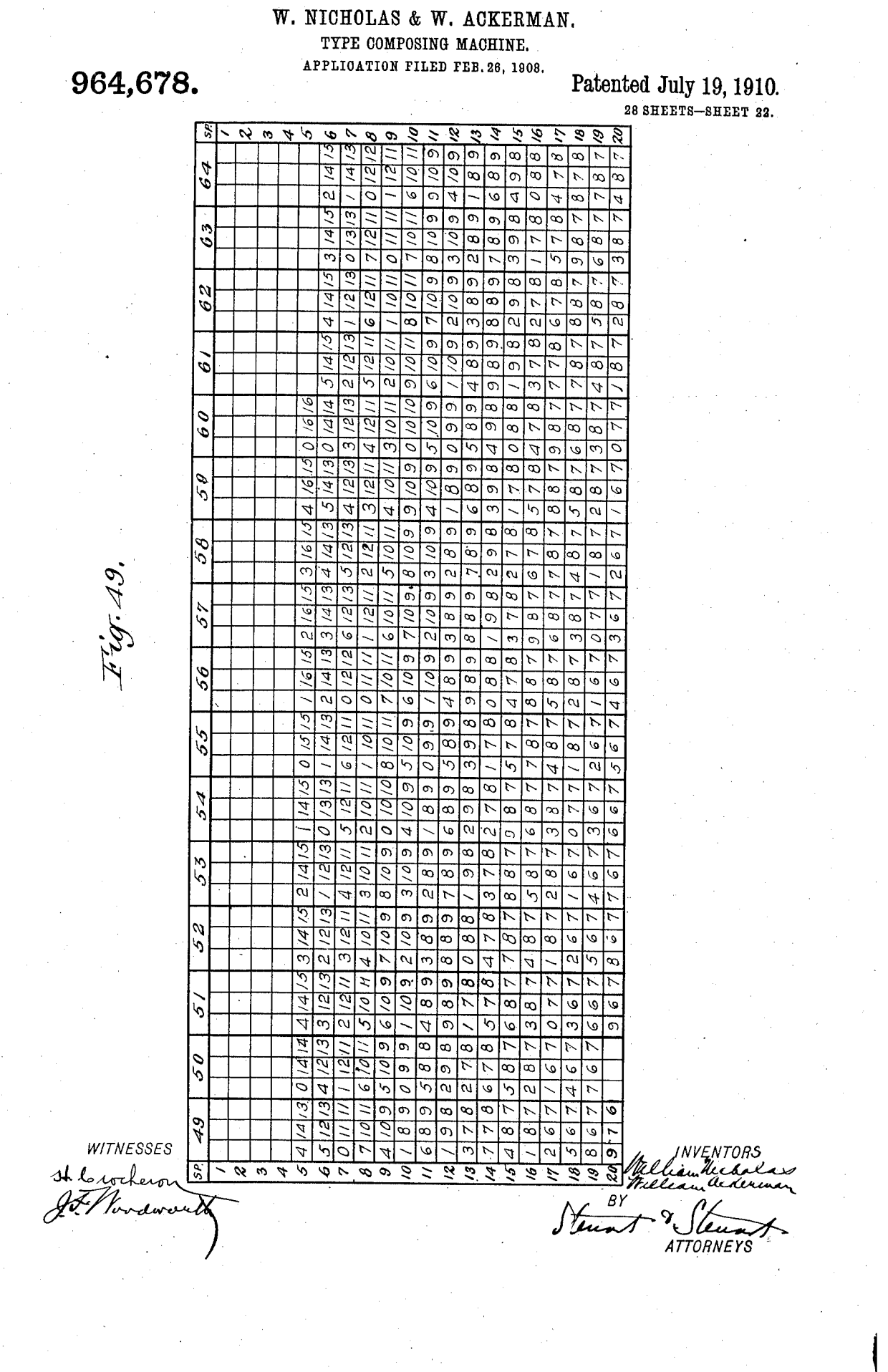

W. NICHOLAS & W. ACKERMAN.
TYPE COMPOSING MACHINE.
APPLICATION FILED FEB. 26, 1908.

964,678.

Patented July 19, 1910.
28 SHEETS—SHEET 22.

Fig. 49.

Fig. 50

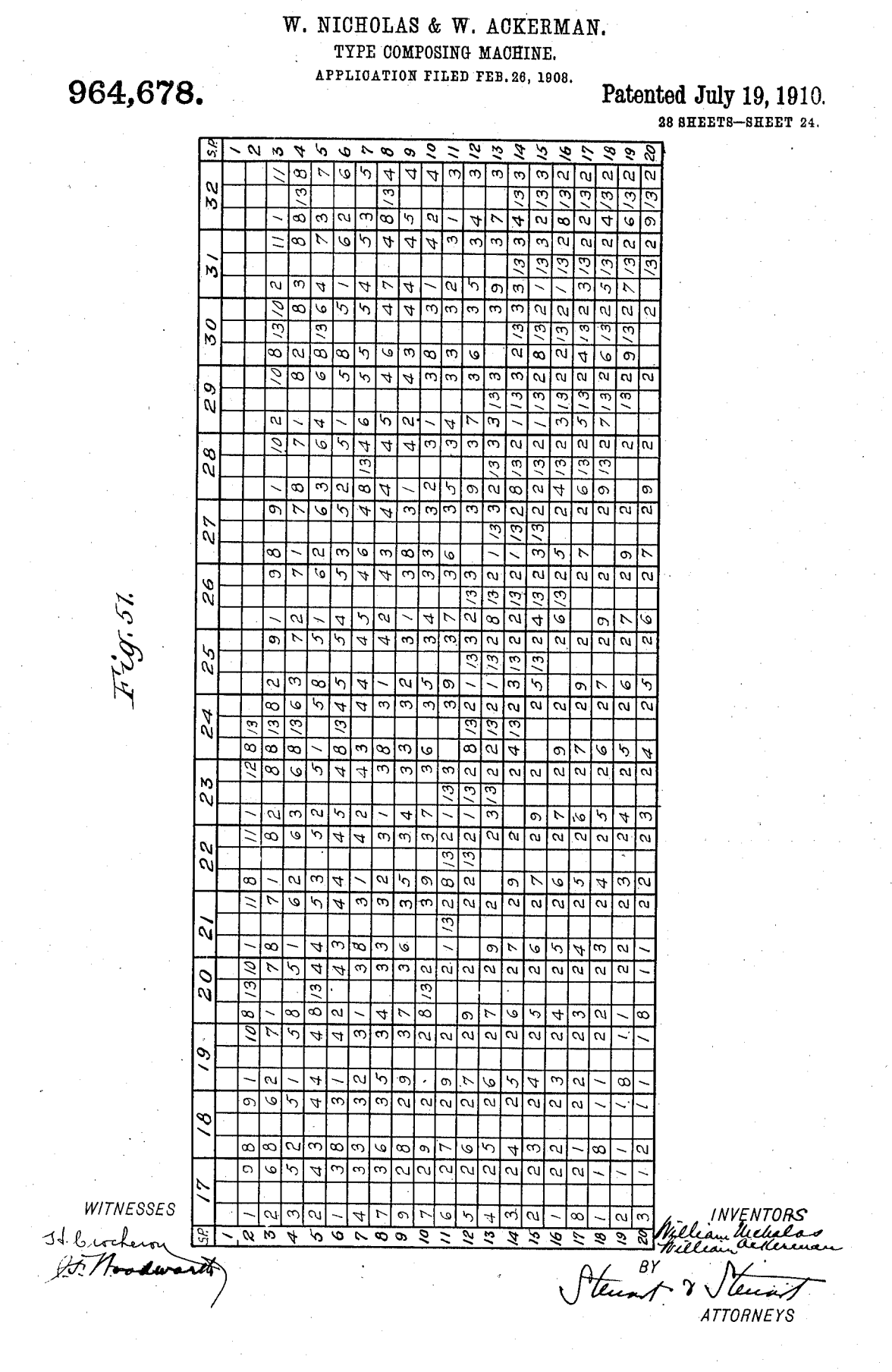

W. NICHOLAS & W. ACKERMAN.
TYPE COMPOSING MACHINE.
APPLICATION FILED FEB. 26, 1908.

964,678.

Patented July 19, 1910.

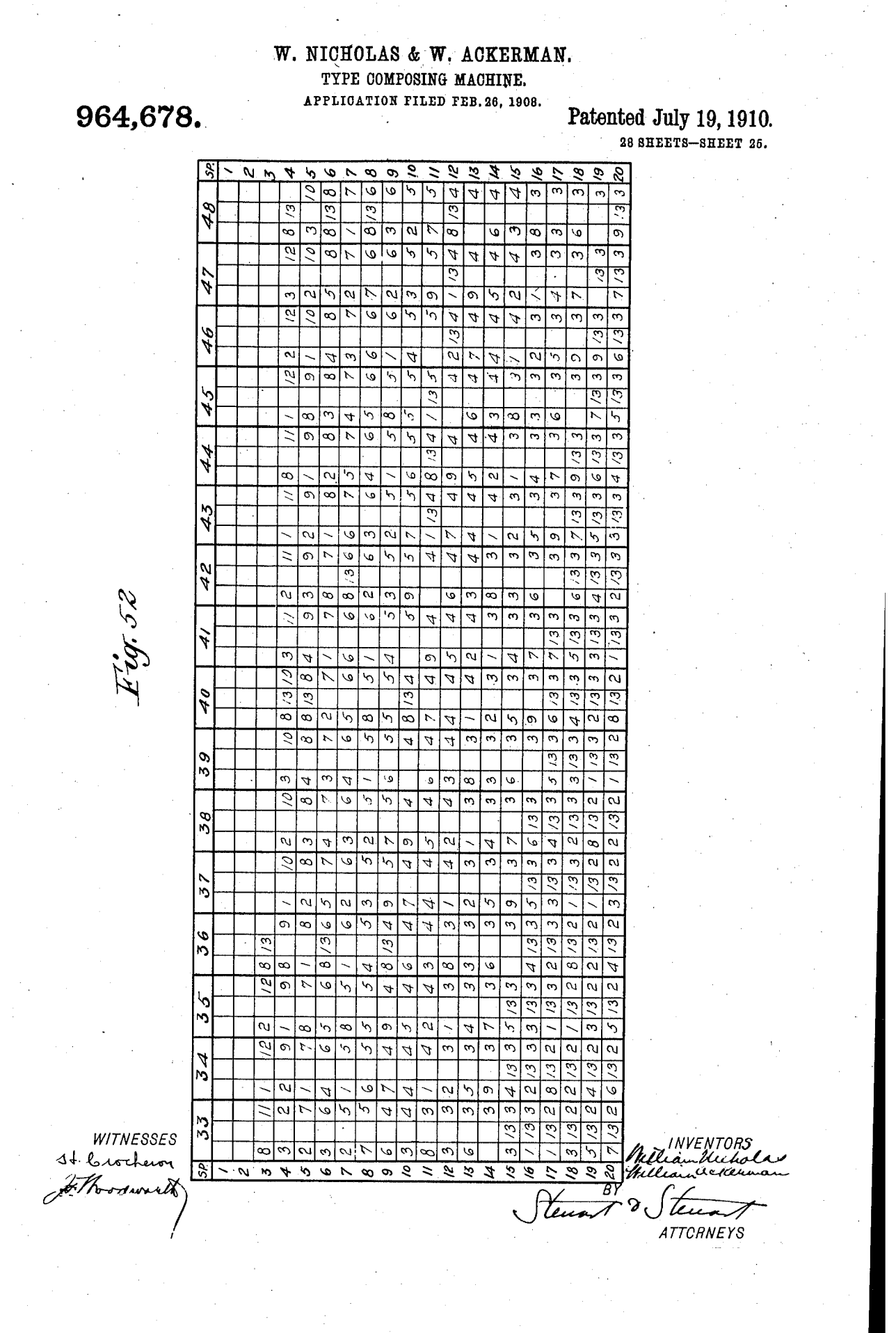

W. NICHOLAS & W. ACKERMAN.
TYPE COMPOSING MACHINE.
APPLICATION FILED FEB. 26, 1908.

964,678.

Patented July 19, 1910.

Fig. 52

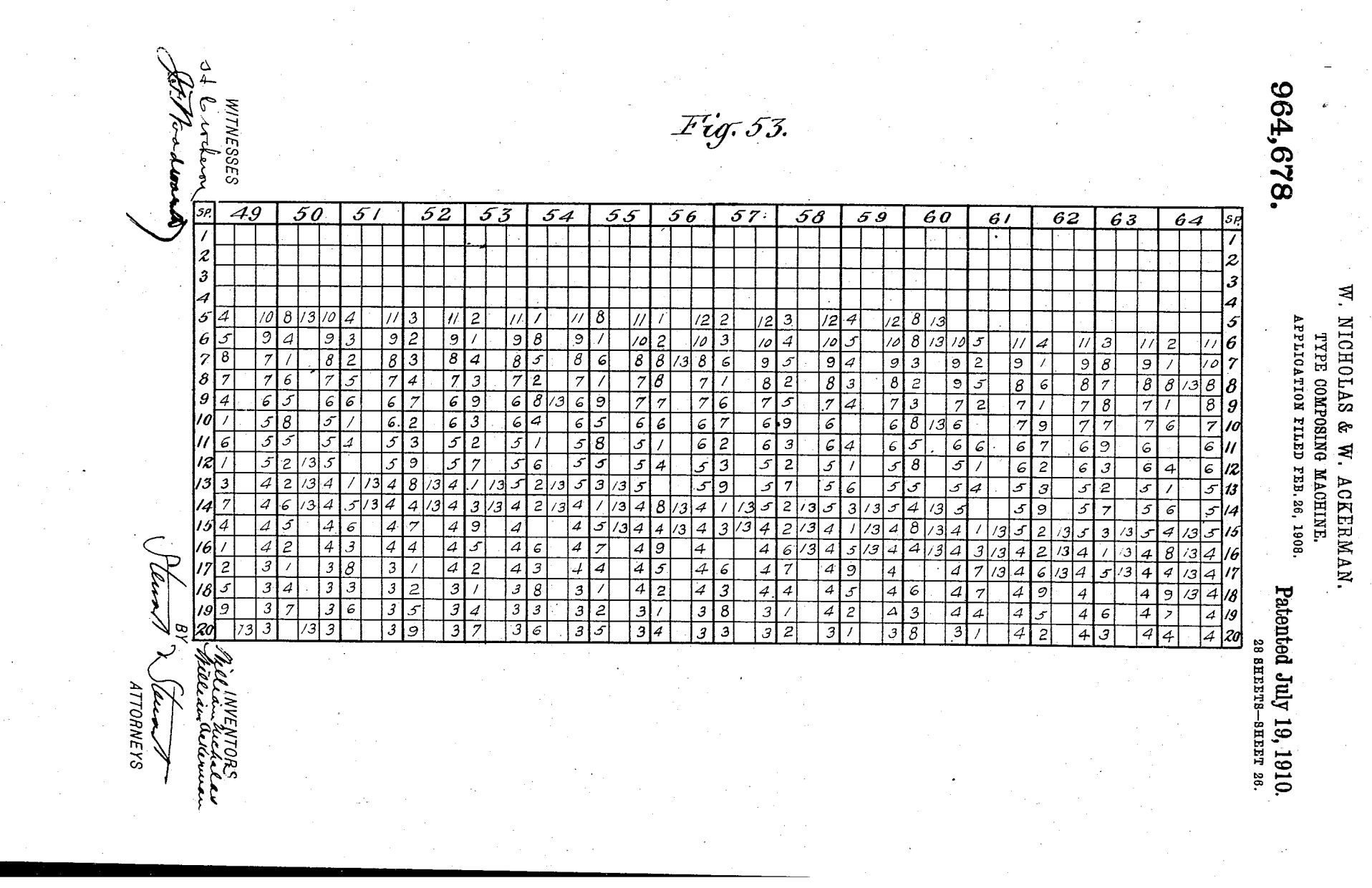

W. NICHOLAS & W. ACKERMAN.
TYPE COMPOSING MACHINE.
APPLICATION FILED FEB. 26, 1908.

964,678.

Patented July 19, 1910.

Fig. 53.

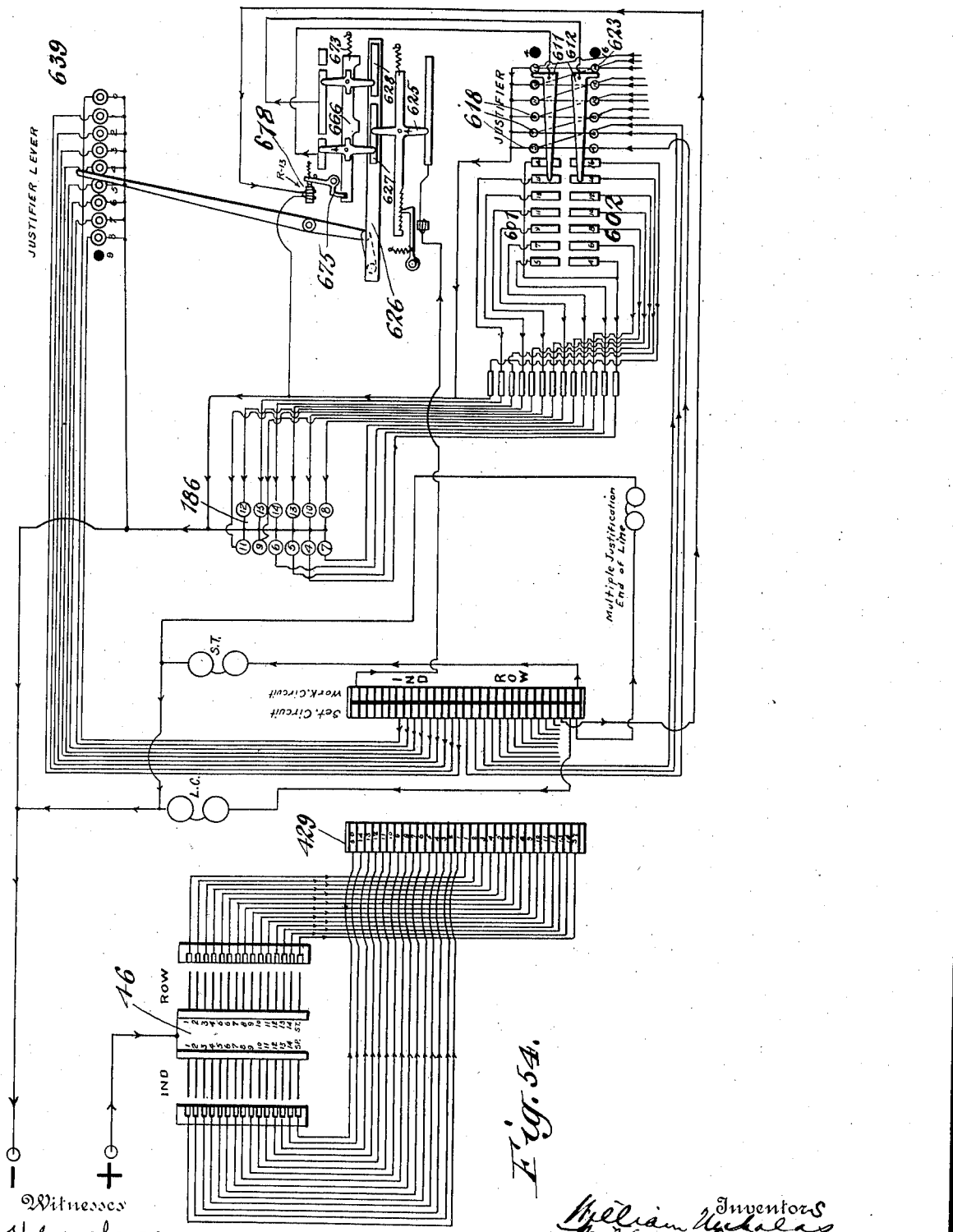

W. NICHOLAS & W. ACKERMAN.
TYPE COMPOSING MACHINE.
APPLICATION FILED FEB. 26, 1908.

964,678.

Patented July 19, 1910.
28 SHEETS—SHEET 28.

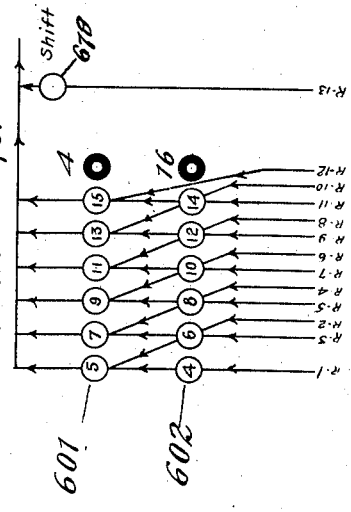

Fig. 58.

| To Make | Use | Shift | Use |
|---|---|---|---|
| All 4w | Dead Stop | | I-8 |
| " 5 | R-1 | | I-8 |
| " 6 | R-2 | R-13 | I-8 |
| " 7 | R-3 | | I-8 |
| " 8 | R-4 | R-13 | I-8 |
| " 9 | R-5 | | I-8 |
| " 10 | R-6 | R-13 | I-8 |
| " 11 | R-7 | | I-8 |
| " 12 | R-8 | R-13 | I-8 |
| " 13 | R-9 | | I-8 |
| " 14 | R-10 | R-13 | I-8 |
| " 15 | R-11 | | I-8 |
| " 16 | Dead Stop | R-13 | I-8 |

Fig. 59.

| To Change After | Use |
|---|---|
| 0 = No Change | I-8 |
| 1 | I-1 |
| 2 | I-2 |
| 3 | I-3 |
| 4 | I-4 |
| 5 | I-5 |
| 6 | I-6 |
| 7 | I-7 |
| 8 | I-9 |
| 9 | Dead Stop |

Fig. 56.

| To Make | Use | Shift | To Make | Use | Shift |
|---|---|---|---|---|---|
| 4 & 5w | R-1 | | 5 & 4w | R-1 | R-13 |
| 5 & 6 | R-2 | R-13 | 6 & 5 | R-2 | |
| 6 & 7 | R-3 | | 7 & 6 | R-3 | R-13 |
| 7 & 8 | R-4 | R-13 | 8 & 7 | R-4 | |
| 8 & 9 | R-5 | | 9 & 8 | R-5 | R-13 |
| 9 & 10 | R-6 | R-13 | 10 & 9 | R-6 | |
| 10 & 11 | R-7 | | 11 & 10 | R-7 | R-13 |
| 11 & 12 | R-8 | R-13 | 12 & 11 | R-8 | |
| 12 & 13 | R-9 | | 13 & 12 | R-9 | R-13 |
| 13 & 14 | R-10 | R-13 | 14 & 13 | R-10 | |
| 14 & 15 | R-11 | | 15 & 14 | R-11 | R-13 |
| 15 & 16 | R-12 | R-13 | 16 & 15 | R-12 | |

Fig. 57.

WITNESSES

INVENTORS
William Nichols
William Ackerman
BY
Stuart & Stuart
ATTORNEYS

UNITED STATES PATENT OFFICE.

WILLIAM NICHOLAS AND WILLIAM ACKERMAN, OF NEW YORK, N. Y., ASSIGNORS TO UNITED STATES GRAPHOTYPE COMPANY, A CORPORATION OF NEW YORK.

TYPE-COMPOSING MACHINE 964,678. Specification of Letters Patent. Patented July 19, 1910.

Application filed February 26, 1908. Serial No. 417,899.

*To all whom it may concern:*

Be it known that we, WILLIAM NICHOLAS, a subject of the King of Great Britain, and WILLIAM ACKERMAN, a citizen of the United States, both residents of the city, county, and State of New York, have invented certain new and useful Improvements in Type-Composing Machines, of which the following is a specification.

Our invention relates to a so-called composing machine, the purpose of which is to prepare a record strip to control a monotype casting machine, so that in the latter machine the type may be cast and set up and the lines thereof be justified. Composing machines of this class, in general comprise type punching mechanism; a character key-board and connections therefrom to the punching apparatus; a means for registering in units the length of the unjustified lines, or sections, of composition whereby the operator may determine the amount of justification for each line required; a space register; and justification mechanisms controlling the punching mechanism, whereby the operator may record on the tape the required justification.

Composing machines as heretofore made, such for instance as the electrically controlled composing machine known as the Goodson machine, have failed to perfectly satisfy the actual requirements of the trade. Such failures have in part been due to the fact that the sizes of type body allowed to the various type recorded on the tape by such machines have been few in number, with the result that the successive sizes of type bodies differ one from the other by too large a unit of set or measurement. Type of body size correctly falling intermediate of two of the sizes offered by the machine have had to be compressed or expanded to the nearest available size of body recorded by the machine. In the Goodson machine the unit variation between successive type body sizes was as great as one-sixth of the full set measurement; and too often in forcing a type face to the nearest of such bodies the type was so distorted that the product of the casting machine was fit for the lowest grades of work only. Again the lay-outs heretofore offered have not been sufficiently large to meet the requirements of the trade. The Goodson machine was operated from lay-outs of but one hundred type characters. Our machine on the other hand is so constructed that the lay-outs may comprise more than two hundred characters.

The above and other deficiencies in monotype composing machines have been met in the present invention, to the end that our machine meets all the requirements of the trade.

One object of this invention is a composing machine adapted to record type of thirteen body sizes, each of such sizes differing from the next larger size by a unit of measurement which is but one-sixteenth of the full set measurement.

Another object of this invention is a composing machine to be operated from a lay-out or key-board comprising substantially two hundred and twenty-five different character keys, which is more than twice the number of such keys in the Goodson machine.

Another object of the invention is a switch or lay-out changing device by means of which any desired change or changes may be made in the lay-out of the matrices of the matrix plate without alteration of the wiring from the key-board to the punch magnets.

Another object of the invention is a switch or lay-out changing device by means of which entire lay-outs may be interchanged in the machine without alteration of the wiring of the punch and unit-register magnets.

Another object of this invention is a novel means by which the spaces are automatically recorded by the justifier mechanism, and by means of the latter, are automatically recorded as part of the justification record on the tape when the operator depresses the key representing the total amount of justification to be distributed to such spaces.

Another object of this invention is a means constructed to record the justification so that the same will always be distributed in full units to the several spaces; either in equal amounts, as when the number of spaces is a factor of the number representing the total amount of justification to be distributed to such spaces; or where not exactly evenly distributable, nevertheless so distributed that no space quad may vary from any other in the same line by more than one unit; and also means whereby one of the lines in which such variation of one unit occurs in the size of the space quads, in some of such lines the quads of the larger of the two sizes are first cast, and in other of such lines the quads of the smaller of the two sizes are first cast.

Another object of the invention is a novel means and method for recording multiple justification.

Another object of the invention is a novel unit register, one of the features of which is a means whereby the indicator needle may be released from its driving mechanism and returned to zero position at the beginning of each separately justified section of composition, whereby the necessity of an accompanying return movement of the driving mechanism is obviated.

Other objects of the invention will presently appear from the following detailed description of the invention in connection with the accompanying drawings in which:

Figure 1 is a perspective view of the assembled composing machine. Fig. 2 is a view in side elevation of the assembled machine. Fig. 3 is a top plan view of the machine. Fig. 4 is a view in rear elevation of the unit register and attached parts. Fig. 5 is a detail view in cross sectional elevation through the character key-board. Fig. 6 is a view in cross sectional front elevation through the character key-board. Fig. 7 is a detail view of one of the character keys. Fig. 8 is a view in cross sectional side elevation through the unit register. Fig. 9 is a perspective detail view of the unit register driving key. Fig. 10 is a detail view of the pawl and ratchet by which the driving key is actuated. Fig. 11 is a view in rear elevation of the lock by means of which the dial is connected to the driving gear. Fig. 12 is a top plan view of the lock shown in Fig. 11 in engagement with the dial gear 68. Fig. 13 is a view in cross sectional elevation through the lock shown in Fig. 11. Fig. 14 is a perspective view showing the lock for holding the dial after each feed of the same. Fig. 15 is an enlarged detail view of the edge of the lock showing the manner in which it engages the dial gear 68. Fig. 16 is a perspective view showing the end-of-line signal circuit closer. Fig. 17 is a detail view in cross sectional elevation, showing the means by which the time of action of the circuit closer of Fig. 16 is adjusted. Fig. 18 is a view in cross sectional side elevation of the circuit closer shown in Fig. 16. Fig. 19 is a view in cross sectional elevation through one of the unit stop pins and device for actuating the same. Fig. 20 is a view in cross sectional elevation through the justification key-board and cylinder. Fig. 21 is a perspective view of one of the justification keys. Fig. 22 is a view in end elevation of the justification key-board, cylinder and line closing or trip key. Fig. 23 is a perspective view showing the circuit closer actuated by the key 76 in Fig. 22. Fig. 24 is a view in side elevation of the justification key-board, cylinder, commutators and escapement device. Fig. 25 is a top plan view of the justification keys. Fig. 26 is a diagrammatic view showing the justification cylinder, escapement device, line signal and circuits including and controlling the same. Fig. 27 is a plan view of the bottom of the bank of justification keys. Fig. 28 is a view in cross sectional elevation through one end of the cylinder showing the spring for turning the same. Fig. 29 is a view of the unit register dials. Fig. 30 is a view in cross sectional elevation through the tape perforating device. Fig. 31 is a view in cross sectional elevation on the line 31—31 of Fig. 30. Fig. 32 is a view in cross sectional elevation on the line 32—32 of Fig. 31. Fig. 33 is a perspective view of the parts shown in Fig. 32. Fig. 34 is a detail perspective view of the means for turning the ribbon feeder. Fig. 35 is a detail perspective view of the cross head for operating the ribbon punches and of the cross head which operates the ribbon feed and punching apparatus. Fig. 36 is a detail view showing the ribbon feed in a different position from that shown in Figs. 32 and 33. Fig. 37 is a diagrammatic view showing the machine circuits. Fig. 38 is a perspective view of the tape winder. Fig. 39 is a view in cross sectional elevation through the tape winder. Fig. 40 is a view in cross sectional elevation through one of the matrix changing or lay-out switches. Fig. 41 is a broken detail perspective view showing three of the plates of the block, Fig. 40. Fig. 42 is a plan view of one of the metallic plates of the block, Fig. 40. Fig. 43 is a plan view of one of the insulating plates of the block, Fig. 40. Fig. 44 is a top plan view of one of the switches of the block used for changing the unit value of the columns of the matrix. Fig. 45 is a view in elevation, partly cross sectional of the block or switch shown in Fig. 44. Figs. 46 to 49 constitute a chart showing the justifications and theory of justification employed in the present machine. Figs. 50 to 53 constitute a chart showing the precise distribution of the circuit closing pins on the justification cylinder and circuits controlled by such pins. Fig. 54 is a diagrammatic view of the justifier of the casting machine, and is incorporated in the present application in order that the distribution of the pins on the cylinder 24, and as illustrated in the chart Figs. 50 to 53, may be understood. Fig. 55 is a detail view showing diagrammatically the circuits controlling the justifier stops shown in Fig. 54. Fig. 56 is a chart showing the justifier setting circuits of the casting machine represented by certain of the pins on the cylinder 24, where space quads of two sizes are to be cast. Fig. 57 is a detail diagrammatic view of the justifier lever stop circuits. Fig. 58 is a chart similar to chart corresponding to that of Fig. 56, where all space quads are to be of the same size. Fig. 59 is a chart showing the circuits employed for changing from one size to another as controlled by certain of the pins on the cylinder 24.

A machine of this class has two broad functions, the first of which is to produce a record to control the selection and casting of type in the casting machine, and the second of which is to produce a record whereby the lines of selected type may be justified as cast, and be finally delivered to the galley. For effecting these two classes of records, the tape perforating apparatus of this machine is controlled by two groups of mechanisms, which will hereinafter be considered separately.

*The record for the casting of type.*—In the casting machine for which the record of the present machine is prepared, the type matrices are arranged in rows on a matrix block adjustable in two directions across the face of the mold whereby by movement of the matrix block in one direction any row of the matrices thereon may be presented to the mold, and by movement of the block in another direction any individual matrix in that row may be presented to the mold. In order then to present any matrix to the mold, the matrix block has a movement which is the resultant of two components at right angles to each other. Two banks or rows of stops arranged at right angles to each other determine respectively the component movements of the blocks. That bank of stops which determines the row presented to the mold are termed the "row" stops, and the stops which control the selection of any individual matrix in the selected row are termed the "individual" stops. The record in the tape for any particular type consists of a "row" perforation controlling some "row" stop and an "individual" perforation controlling some "individual" stop, with this exception, however, that the last row is called or when the last individual stop in any row is called for, then the stop may be stationary and no controlling perforation is required. For punching the desired holes in the tape, there is in the composing machine forming the subject matter of this specification, a bank of row punch pins and a bank of individual punch pins, the several pins in each bank being operated by electromagnets, which are termed "row" magnets or "ind" magnets, according as they actuate "row" or "individual" punch pins.

Whenever a record of any type character is to be punched in the tape, one "row" magnet and one "ind" magnet are simultaneously energized, except in the instances above noted, when the stationary stops in the casting machine are employed, in which last instance, the record may consist of a "row" or and "ind" magnet only. In order that the proper "row" and "ind" magnets may in each instance be energized, the circuits of the desired magnet or pair of magnets are led to a circuit closer controlled by a key bearing a letter or representation corresponding to the record punched in the tape when that particular circuit or pair of circuits are closed. These character keys are arranged on a key-board machine after the style of a typewriter key-board. This board and the connections thereto from the "row" and "ind" punch magnets will now be considered.

Referring to Figs. 1, 3, 5 and 6, it will be seen that there are fifteen rows of fifteen characters each upon the key-board, representing a complete font of type or any layout of characters which for any particular purpose may be desired. The characters are preferably arranged according to the standard typewriter key-board. By reason, however, of a peculiar switch or mechanism for interchanging at will the matrix lay-out, to be described hereinafter, there is no one necessary position upon the key-board for any character. It is, however, undesirable that the position of the characters on the key-board be necessarily changed since in so doing, the operator loses the advantages of familiarity with the key-board, and speed in operation is, consequently lessened.

Referring to Figs. 5 and 6, each character key 9 is shown as mounted upon a stem 10, passing through the face 11 of the key-board, and carrying at its lower end two contact pins 12 and 13, which, when the key 9 is depressed, dip respectively into two mercury wells 14 and 15 in the base face 16 of the key-board. Where, however, the character is in the last row, or is the last character in any row, but one contact pin is carried by the stem. Springs 23 attached on the one hand to collars on the stems 10, and on the other hand to the key-board plate 11, serve to return the keys to a normally elevated position after each depression. The stem 10 of each key carries a lug or pin 17 engaging, when the key is depressed, one of a set of pins 18 carried on one of a set of pivotally mounted rods 19. Each of the rods 19 carries another pin 20, which, when the rod is rocked by the engagement of the pins 17 and 18 on depression of one of the keys 9, engages one of a set of pins 21 on a rod 22. There is a rod 19 for each line of character keys, and one of these rods is therefore rocked every time any character key 9 is depressed. Since each of the rods 19 is provided with a pin 20 to engage the rod 22, the rod 22 is moved in the direction of the arrow (Fig. 5) whenever a character key is depressed.

The rod 22 passes through the rear of the key-board frame, as shown in Fig. 5, and carries on its extremity a contact 24, which, when the rod 22 is moved outward, engages a contact 25 at the back of the key-board. The contact 24 is in electrical connection with the key-board frame, and through the same with the stems 10 of each of the keys thereon; and the contact 25 is in electrical connection with a switch 6, (see Fig. 1) through which the current is supplied to the machine. The depression of any character key will then, by means of the rod 22, connect that key electrically to the switch 6, and as the key is depressed so that the contact pins 12 and 13 at the lower end of the stems thereof, enter the wells 14 and 15, the circuits from the switch 6 are closed through the depressed key to connections 214 and 219. The connection 214 leads to the "ind" punch magnet and the connection 219 to a "row" punch magnet, whereby upon depression of any key, the proper record is punched in the tape.

In addition to the type keys 9 on the keyboard, there is also a key or bar 8 controlling certain peculiar connections to the punch magnets, by means of which a record is punched in the tape such that as the tape enters the casting machine, the proper space quads may be cast in the line. The space key controls a number of connections to be presently more fully described. For the moment, it is sufficient to note that the stems 28 and 29 on which the space bar 8 is mounted are each similar to the stems 10 on which the type keys are carried, in that each of the space bar stems carries at its extremity two contact pins, and carries also a pin 17 engaging a pin 18 on the bar 19 in turn carrying a pin 20 to engage and move the rod 22. When, then, the space key is depressed, the contacts carried thereby are electrically connected through the rod 22 to the switch 6. The space bar is likewise provided with springs 23 for returning the bar to a normally elevated position. In order that the space bar may be depressed evenly, the stems 28 and 29 engage, by means of collars 39, each with a lever 40, which latter are interlocked to rock together by means of a pin 41 in one of the levers engaging a slot 42 in the other.

*The unit register.*—A composing machine comprises a unit register by means of which the operator may determine the length of the lines and the justification necessary to be supplied thereto. The type cast in the casting machine are each of a body or size which is some multiple of the unit of "set" measurement. In the present machine the unit is one-sixteenth of the full "set" measurement. The unit, therefore, varies with the "set" of the type. The casting machine for which the tape in this machine is prepared, is adapted to cast type of thirteen sizes to each "set", such sizes running from the four to sixteen unit measurement. As each character is punched or recorded on the tape in the present machine, the needle of the unit register is advanced a number of points equal to the number of units of type body to be cast for that type in the casting machine. The normal or unjustified space quad cast by the casting machine is of four unit body, and so whenever the operator at the composing machine strikes the space key, the needle of the register is advanced four points. The register, therefore, shows the total length in units of the unjustified line of type, and the operator on reaching a convenient stopping point for such a line, may from the reading of the register determine the amount of justification in each instance necessary to be supplied to the line to bring it to the predetermined column width. The character and space keys on the keyboard 2 should, therefore, have operative connections to the unit register as well as to the punch magnets. It has been previously stated that the character matrices are arranged on the matrix plate of the casting machine in rows according to the "set" size of the type bodies to be cast for such matrices. It has also been seen that the stops for selecting the "rows" are governed by the "row" punch magnets of the composing machine, and these in turn by one of the connections from the character keys. Since, therefore, the "row" connection from each character key depends upon the unit of "set" of the type body to be cast for that character, this same "row" connection may be conveniently employed in each instance to govern the action of the unit register. Each of the "row" connections from the character keys, therefore, leads to the unit register as well as to a "row" punch magnet. The register and the means by which these "row" connections govern the action of the register will now be described. This register is shown in Fig. 1, incased, and having on its front face a double dial 43—44 shown in detail in Fig. 29, over which the indicator needle 7 is moved. The smallest divisions on the edges of the dials represent units. The total number of units shown on each dial is 500. The divisions on the dial 43 are numbered clock-wise and the divisions on the dial 44, counter clock-wise. The needle is adapted to advance clock-wise around the dial thrice, thus enabling it to indicate a possible width of 1500 units of column of composition.

From the zero position on the dial 44 the divisions are numbered backward from 0 to

64. The machine provides for justification up to 64 units, and when, at the end of the line of composition, the needle has entered that portion of the arc of the dial 44 numbered 64 to 0, the operator may readily determine from the reading of the needle, the amount of justification necessarily required for the line.

In order that the zero position of the needle and any subsequent position thereof may be readily determined where the column width is greater than 500 units, or one revolution, and yet is not as great as 1000 units, or two revolutions, the dial 43 is rotatably mounted on a central axis, and may be locked in any position by the set screw 45. Where column width is either 500 units or 1000 units, the zero positions of the dials 43 and 44 naturally coincide, but where the column width is between 500 and 1000 units—say, for example, 600 units, the dial 43 is locked so that its zero reading coincides with the 100 reading on the dial 44. Then the needle 7 starting from the zero point of the dial 43 travels 100 units to the zero point of the dial 44 and then 500 units around the dial 44, the zero point of the latter making 600 units of travel in all. The distance the needle has traveled may always be readily determined from the reading of the dial 43, and the distance the needle has yet to go, may always be determined from the reading of the dial 44, because the marking on the latter dial is reverse to that on the dial 43.

The dials of the present machine show the units of set measurement of type characters and spaces recorded at any point of the line. The reading of the record is not delayed until the indicator needle is within the justification limits at the end of the line as in many machines. The dials of the present machine greatly facilitate the work of multiple justification, that is to say, of producing several justified sections in a single line. Where multiple justification is employed, the needle is set on the dial in an initial position and the operator bearing in mind or marking upon the dial the number of units to be contained within the justified section of the line, operates the machine until the needle is within the justification limits of the point so marked on the dial, whereupon the proper justification key is operated to record the justification. By mechanism hereinafter to be described, the needle is then returned to its initial position before the next justified section is recorded. The needle returns to its initial position by the simple operation of a key and requires no setting by the operator such as heretofore required in the art where multiple justification was to be had. Since the needle starts from its initial position for each justified section of the line, only a portion of the dial is likely to be used in multiple justification, and the advantage of having a reading possible at any point of the line, as in the present machine, is, therefore, obvious.

The operating mechanism of the unit register is shown in Figs. 3, 4, 8, 9, 10, 11, 12, 13, 14, 15, 16, 18 and 19.

Referring to Fig. 8, the indicator needle 7 is shown as clamped to the shaft 46. This shaft is driven by a spring actuated lever 50 on a counter-shaft 66. The lever 50 is set and the extent of its movement determined in each instance by the armature lever 47 of a magnet 48 hereinafter termed the king magnet. The lever 50 whenever actuated moves under the power of its actuating spring 64 (see Fig. 9) to a fixed stop. It is moved by the armature lever 47 of the king magnet against the action of the spring 64 to an initial or setting position, which varies according to the extent of movement desired to be given to the needle 7. The stopping point of the armature lever 47 in its setting action determines the point from which the lever is moved by the spring 64.

The king magnet is actuated every time any character, or the space key, on the keyboard is operated. The extent of movement of its armature 47 with the lever 50 which it engages, depends, however, upon which of a number of stop pins 49, (see Figs. 4 and 19) has previously been projected into the path of the lever 50. Each of the stop pins 49 is normally held out of the path of the lever 50 by a coil compression spring 51, but is adapted to be projected into the path of the arm 50 by a lever 52 attached to the armature of one of a series of magnets 53. The magnets 53 are controlled by the row connections from the character keys. All characters calling for the same unit body have their "row" connection leading to the same magnet 53. All characters of a four unit body are, for example, in circuit with the stop magnet 53, controlling the pin $49^4$, those of 6 unit width with the pin $49^6$, and so on. The uppermost pin $49^{16}$, representing the greatest unit body may be stationary, and no connection thereto is required.

As the armature 47 of the king magnet 48 is drawn down by that magnet, the motion is transmitted by an arm 55 to one arm 56 of a bell crank lever, the other arm 57 of which carries the rack 58, engaging a corresponding rack 59 on an arm 60, which, together with the arm 50, forms another bell crank lever. The arm 50, as above mentioned, projects over the pin-board 54, and is adapted to engage and be stopped by any one of the pins 49 in said board which may be projected into its path. The arm 50 carries a spring pawl 61 adapted to pass idly over the teeth 62 of a ratchet wheel 63, as the armature 47 is actuated to move the lever 50 to its starting position. When the arm 50 is stopped by one of the pins 49, the pawl 61 engages one of the teeth 62 of the ratchet wheel 63. The movement of the arm 50 under the impulse of the magnet 48, being against the tension of a coil spring 64, it follows that as soon as the magnet 48 is demagnetized, the arm 50 under the impulse of the spring 64 returns to its original position determined by the fixed stop 64' (see Fig. 10), carrying with it as it returns the ratchet wheel 63 by reason of the engagement of the latter with the pawl 61. The ratchet wheel is prevented from back lash or loose or reverse movement by a pawl 65. A shaft 66, on one end of which the ratchet wheel 63 is fixedly mounted, carries at its other end a pinion 67 engaging with a larger spur wheel or pinion 68, mounted on ball bearings on the shaft 46, as shown in Fig. 8. Fixedly attached to the shaft 46 is a sleeve 69, (see Figs. 8, 11 and 13) and attached to the sleeve 69 is an arm 70 carrying a pair of fingers 71 pivotally mounted to rock in a plane perpendicular to the gear 68, and in one position adapted to engage between the teeth of the gear 68, whereby, when so engaged, the gear 68, the sleeve 69 and the shaft 46 may rotate together, and the indicator needle to be thereby advanced each time the king magnet 48 is operated.

Referring to Fig. 12, it will be seen that the fingers 71 are so spaced with respect to each other that, no matter what the position of the gear 68, one or the other of said fingers will always fall between the teeth of the gear 68 when rocked on their pivots. Heretofore in the art, the element corresponding to the gear 68 has had as many teeth or points of engagement for the locking fingers as there were unit divisions on the face of the dial, so that for each tooth advance of the disk there would be an advance of one unit of the indicator finger on the dial. Such an arrangement, however, necessitated an undesirably large toothed disk, and on the other hand, restricted the number of readings on the face of the dial. The gear 68 of the present machine, however, although moving with the dial needle as heretofore in the art, is, nevertheless, much smaller and more compact than the disks heretofore used and has on its periphery but 250 teeth, while as we have seen the dial has 500 unit sub-divisions. In other words, the gear 68 has but one tooth for every two sub-divisions on the dial. The construction of the present gear 68 for use with the dial shown has been made possible by applicants by reason of the double locking fingers 71 stepped the one from the other half the distance between two adjacent teeth on the gear. By this arrangement, though the gear move but half the distance of one tooth or any multiple thereof, nevertheless, one or the other of the locking fingers 71 will engage it upon the return of the arm 70 to its initial position. Where a single revolution of the indicator needle is to suffice for recording an entire line of composition, even where that line may contain many hundred units, the advantages of the applicants' gear locking device are obvious.

The applicants' gear 68 differs in other respects from elements heretofore found in the art for performing its functions. It will be noted that the gear 68, in addition to locking with the fingers 71 to determine the position of the indicator needle, is itself part of the driving gearing of the indicator needle, the teeth of the gear 68 being ordinary gear teeth adapted to gear with and be driven by the teeth of a pinion 67. Heretofore in the art, it has been found necessary to make the toothed periphery of the gear 68 of special design for engaging the locking fingers. The locking fingers have heretofore been so mounted and operated as to engage the gear by a radial movement toward and into the periphery of the same. In such cases, unless the teeth were peculiarly designed, the locking fingers would be liable, upon the sudden stopping of the gear 68, to continue their motion on account of momentum. In the present machine, however, the fingers as heretofore pointed out move in a plane perpendicular to the plane of the gear, and there is no tendency or possibility of momentum releasing them from the gear 68. Where the locking fingers are arranged as in the present invention, no special design of tooth on the disk is necessary. Consequently, the gear teeth forming part of the driving gearing are used to advantage without modification of any sort.

Referring to Fig. 3, it will be seen that the inner ends of the pivotally mounted fingers 71 are adapted to be engaged by a collar 72 on the shaft 46. When this collar is moved on the shaft toward the dial so as to engage the inner ends of the fingers 71, the latter are rocked on their pivot and withdrawn from the teeth of the gear 68. The collar 72, in turn, is engaged by an arm 73 forming part of the armature lever 74 of a release magnet 75. This release magnet is adapted to be actuated by a release key 76 on the justification key-board through connections hereinafter to be described, and when so actuated, operates through its armature 74 and the collar 72 to release the fingers 71 from the gear 68, and, consequently, to release the needle 7 from the driving gearing. A clock spring 77, (see Fig. 8) one end of which is attached to the shaft 46, and the other end to a fixed point 78 on the machine frame, acts when fingers 71 are released from the gear 68 to return the latter, together with the shaft 46 and the indicator needle 7 to the zero position. In order that this return may not be too violent, there is attached to the shaft 46, a brake disk 79 (see Figs. 3, 8 and 9) adapted when the release magnet 75 is operated, to be engaged by a brake shoe 80. The brake shoe 80 is attached to one arm of a bell crank lever 81, pivotally mounted as at 82 on the frame. To the other arm of the lever 81 is attached one end of a spring 83, the other end of which is attached to the armature lever 73. The tension of the spring 83 tends to rock the shoe 80 against the brake disk 79. This action of the spring is, however, normally prevented by a pin 84, on the lever 73. When the armature lever 74 is in its normal position, this pin engages the lever 81 preventing the latter from rocking the shoe 80 into engagement with the disk 79. When, however, the armature lever 73 is actuated in response to the release magnet 75, the pin 84 is withdrawn from the lever 81, and the latter is thus delivered to the action of the spring 83, whereby the brake shoe is applied at the time the needle shaft is released to the return spring 77.

*The line signal.*—When the indicator needle 7, driven around the dial by the mechanism just described, reaches that part of the dial within the limits of justification, or reaches any other desired point on the dial, there is a signal, in the present instance, an electric light 85, to notify the operator that he has about reached the end of the line. The circuit of the lamp 85 is controlled from the indicator driving mechanism by the following means: The wires of the lamp (see Fig. 8) are connected to mercury wells 86 in the base of the frame on which the driving wheel is supported, and these wells are in turn in electrical contact with pins 87, immersed therein. From one pin 87, one of the light wires 88 extends to contacts 89 and 90 (see Figs. 3, 4, 16, 17 and 18) mounted on the upper part of the frame of the driving mechanism about opposite the shaft 46. Fixedly secured to the shaft 46 is a worm 91, (see Figs. 3 and 8) and engaging said worm is an interiorly threaded collar or worm-wheel 92, adapted to be moved along the shaft toward the dial as the shaft is driven by the gearing and to be returned when the shaft is returned by the spring 77. Pivotally mounted at the point 93, (see Fig. 16) on the frame, is a lever 94. The lever 94 at its inner end forms a yoke or fork 95, the arms of which are pivotally attached to the sleeve 92. The other end of the lever 94 is connected to a slide 96, mounted to have reciprocal movement in a groove or way 97 in the frame. On the upper face of the slide 96 is a metallic contact strip 98 of sufficient length to span the distance between the contacts 89 and 90 of the lamp wires. When the sleeve 92 is in its extreme left-hand position on the worm 91, as shown in Fig. 8, the slide 96 is in the position shown in Fig. 16, from which it will be seen, that the contact strip 98, engages the lamp terminal 90, but does not engage the terminal 89. Consequently, the lamp circuit is broken at this point. When, however, by reason of the rotation of the shaft 46, in response to the driving gear, the sleeve 92 is advanced to the other end of the worm 91, the slide 96 with the contact strip 98 is moved by the lever 94 to engage the contact 89, thus closing the lamp circuit through the two contacts 89 and 90.

The movement of the slide 96 is designed to close the contacts after such a movement of the shaft 46 as will bring the indicator needle 7 to the justification reading 64. The time at which the slide closes the contacts may, however, be regulated at will, as follows: The contact 89 is carried by a block 99, mounted to slide upon the stationary extension 100 of the frame. An adjusting screw 101, supported on the extension 100, is in threaded engagement with the stationary block 102, carrying the contact 90, so that by turning the screw it may be moved longitudinally on the extension 100. The screw is free to turn in the block 99, but by means of collars on the screw, the block 99 is locked thereto to move longitudinally with the same to or from the block 102 when the screw is turned. Thus, it will be seen that, by simply turning the adjusting screw 101, the contacts 89 and 90 may be adjusted to or from each other on the extension 100, and the distance between the two thus varied at will. According to the distance of the contacts 89 and 90 from each other, a greater or less movement of the indicator needle 7, and the slide 96 will be required before the latter closes the contacts 89 and 90.

*Stop for indicator needle.*—Referring to Figs. 3, 16 and 18, it will be noted that the slide 96, in addition to carrying the single contact 98, is provided with an extension 96', the function of which is to serve as a stop for the needle to arrest the latter at its initial position on its return movement when released from the driving mechanism. As shown in Fig. 3, the extension 96' of the slide 96 is adapted in one position of the slide to protrude into the path of the member 70, which carries the finger 71 for driving the indicator needle. When the member 70 is released to the action of the spring 77, it revolves backward until stopped by the extension 96' lying in its path. The extension 96' does not, however, remain at all times in the position shown in Fig. 3; otherwise, a plurality of continuous revolutions of the indicator needle would be impossible. When the indicator needle begins recording units on the dial, the slide 96, as we have seen, begins to move toward the farther single contact, and necessarily carries with it the extension 96'. By virtue of this movement of the slide 96, the extension 96' is out of the way of the member 70 when the latter continuing to record has completed one revolution around the dial, and the member 70 is free to pass the stop 96' in its forward movement to make another revolution around the dial. As soon, however, as the release key is operated, delivering the shaft 46 with the member 70 and the worm 91 to the action of the spring 77, the stop 96' is urged toward the plane of movement of the member 70, intercepting the same in time to stop the indicator needle at its initial position. It is believed that it is new in the present invention to provide for several revolutions of the indicator for the purpose of registering units, while yet arresting the indicator at its initial position in one or less than one revolution. Lines of composition of any conceivable length may be recorded in a machine constructed on the principles of the present invention.

*Lock for the indicator needle.*—After each impulse of the driving mechanism, and before the return of the armature lever 47 and the stop lever 50 to their initial positions, the indicator needle 7 is locked in its advanced position until the next impulse. Heretofore in the art, it has been customary to lock the needle after each feed by means of a pawl, such for instance, as the pawl 65, (see Fig. 9), engaging a ratchet in the driving mechanism. It has been found, however, that such a pawl while effective and necessary to hold the driving mechanism against the tension of return springs and the like, is not sufficiently accurate in its operation to maintain the indicator needle at precisely the point to which it has last been fed on the dial. In such driving mechanism, there is always a certain amount of free movement or back-lash, and this no matter apparently how slight is, nevertheless, sufficient to render the needle reading inaccurate or uncertain. For the purpose of eliminating this error and of absolutely fixing the indicator at its proper reading, we have devised a lock for the same. For so locking the needle, there is provided a magnet 103, (see Figs. 4 and 14) the circuit of which is closed after each advance of the needle, as hereinafter to be described, and which, when energized, operates an armature 104, integral with an arm or lever 105. The arm 105 is attached at its outer end, as by a spring 106, to a double locking lever 107, 108. This double lever is pivoted to the frame at 109 over the drive gear 68, and has serrated or toothed edges 110 to engage the teeth of the latter gear. The locking lever 107—108 consists of two separate levers adapted to have a slight movement independent of each other. As indicated in Fig. 15, the teeth on the levers 107—108 are so staggered with respect to each other that no matter what the position of the gear 68, one or the other of the levers 107 and 108 will always engage between the teeth of the gear, thereby preventing any back lash or movement of the needle after the forward feed of the same, as determined by the stop pins 49. As in the case of the fingers 71, one or the other of the levers 107 and 108 will engage the gear 68, though the latter be fed but half the distance between two adjacent teeth or any multiple of half such distance.

*Justification.*—The means by which the punch magnets are selected and controlled to record the type symbols in the tape having been described, and the means by which the unjustified line is recorded in units in the unit register, having also been described, we are now ready to consider the means by which the proper record is placed in the tape at the end of every line to set the justifier of the casting machine to justify the line as it is cast in the latter machine. In order, however, to understand the purpose and functions of the several features of the justification recording mechanism of the present machine, it is advisable first to consider the theory of justification here employed and also to consider briefly the means employed in the casting machine for carrying the same into effect.

In the present machine, the lines are justified automatically to a uniform unit length. The justification is invariably additive, that is to say, whenever justification is necessary, the composition is stopped short of the end of the line, and the number of units necessary to fill out the line added thereto. The composition cannot overrun the line and the latter be then justified by the subtraction, as is the case of the Goodson and other machines. The justification is distributed along the line by increasing in amounts of one or more units the size of the space quads only; the type bodies are not affected by justification. The justification is not fractional; that is to say, no space quad is varied from the normal by fractions of units.

In the casting machine, the necessary justification is distributed to the several spaces in amounts as nearly as possible equal. It is obvious, however, that since the justification is never fractional, the distribution can be absolutely equal only when the number of spaces in the line is a factor of the number representing the total of units of justification to be added to that line. This situation does not ordinarily arise; and so there must usually be a variation in unit body of the space quads. No space quad in any line, however, varies in body from any other space quad in that line by more than one unit.

The machine has a justification capacity of sixty-four units; that is to say, a line sixty-four units short may be brought to proper length. Occasionally a combination arises within the sixty-four unit capacity of the machine in which justification is not possible. For instance, there must in every casting machine be a practical limit to the size of quad which the machine can cast, or in other words, a maximum of the set size of mold cavity. In our casting machine this maximum is sixteen units. If the line be, say, forty-eight units short and contains but four spaces, the forty-eight units would be distributed evenly among the spaces, so that each space quad would ultimately have a body of sixteen units; which is the maximum body the machine casts for any set. If, however, there be less than four spaces among which to distribute the forty-eight units, it is obvious that justification will be impossible, since in such case, each space quad would require a body of more than sixteen units, which is a larger slug than the mold casts. Just as the limit to the size of mold cavity in certain rare instances precludes justification, so also under certain unusual conditions, as will presently appear, the limit to the number of available setting circuits may make justification impossible, where the number of spaces is too great.

Where the space quads in a justified line are to be of two sizes, it is convenient to set the justification mechanism of the casting machine, so that all space quads of the same size are cast successively. The mechanism is, therefore, first set to cast one size of space quad, and only after all quads of that size are cast, is it set to cast the quads of the other size. Let us assume, for instance, that a line having nine spaces is to be justified by the addition of twenty units. The normal or unjustified space quad of this machine is of four unit body. By adding two units to seven of the nine quads and three units to the other two quads, the twenty additional units of justification required, is supplied. The first seven quads will then be of four plus two, or six unit, body, and the other two, of four plus three, or seven unit, bodies.

In Figs. 46, 47, 48 and 49 is a chart showing every possible distribution of from one to sixty-four units of justification, among from one to twenty spaces. The number of spaces in the line is indicated in the vertical columns at the left and the right of the chart, and the total amount of units of justification to be distributed is indicated in horizontal lines, at the head of the chart. In the example cited, where twenty units of justification is to be distributed to nine spaces, the sizes of the space quads to be cast would be found upon reference to the fourth column of Fig. 47, at the head of which the number "20" appears, and to the line in that column opposite the space number "9" at the side of the chart (Fig. 47). The figures thus found are in this instance "7—6—7". The last "7" indicates that the quads last cast are 7 unit quads. The middle figure "6" indicates that the quads first cast are 6 unit quads. The first figure "7" indicates that there are seven quads of the first size to be cast, before the mold is changed to cast the quads of the other size. We have already found that in the instance cited there were to be seven six unit quads and two seven unit quads, or, as expressed by the table, there were to be seven six unit quads and the others, six unit quads. When all quads are to be of the same size; that is to say, where the amount representing the total number of units of justification required is evenly divisible by the number of spaces in the line, then, of course, there is no change in the mold setting. In such cases the first of the three figures will be a zero, to indicate no change. All impossible justifications are indicated in the chart by blanks. The example cited, viz., the attempted distribution of forty-eight units to less than four spaces is shown to be impossible upon reference to Fig. 48.

In Fig. 54 there is diagrammatically shown the following elements of the casting machine, to wit, the mold stops 186, the justifier and the connections therefrom to the index head, the parts being lettered as in the casting machine (application 417,898 filed February 26, 1908). The justification mechanism of the casting machine, according to its setting, controls the size of space quads to be cast by determining which of the circuits of the mold stop magnets 186 shall be closed by the space holes in the tape. All space holes punched in the tape by the depression of the space bar 8 of the composing machine (see Fig. 6) register with the same pin SP46 at the index head of the casting machine, and, therefore, the stop magnets 186, in order to be operated for the casting of space quads, must be placed or set in the circuit of that pin. It is the function of the justification mechanism of the casting machine to select the circuits of the stop magnets to be so utilized, and to connect the selected magnet to the space pin SP46, or, if two stop magnets are required, as when the space quads are of two sizes, not only to select the circuits of those two magnets, but separately to connect first the one and then the other to the space pin SP46, so that, for a certain number of spaces, the circuit of the one stop magnet may be closed by the space pin, and thereafter the circuit of the other. In the example cited, where the space quads are to be first of six unit body and then of seven unit body, the justification mechanism will select the circuits of the six and seven unit stop magnets 186, whereupon it will maintain a connection between the six unit stop magnet and the space pin, until seven space quads have been cast, as indicated in the chart, after which it will disconnect that magnet from the space pin and connect the seven unit stop magnet thereto for the casting of the remaining two space quads.

The mold stop magnet terminals are arranged at the justifier in two rows 601 and 602, (see Fig. 54), the odd units in one row and the even units in the other, as indicated in the diagram in Fig. 55, so that when two sizes are required, one terminal must be selected from each row. Two terminals, if selected from the same row would differ by at least two units, which is a greater variation than the space quads are ever permitted to have in this machine. Adapted to be moved, one over each row of contacts, are two sliding contact fingers 611 and 612 (see Fig. 54), each of which is connected to one of the contacts 627 and 628 of a switch or circuit changer by means of which circuit changer, first the one and then the other of the selected stop magnets may be connected to the space pin 46 at the index head.

The switch or circuit changer employed in the casting machine comprises, in addition to the contacts 627 and 628 a movable contact finger 625, at all times connected to the space index pin SP46, but adapted to be shifted from one to the other of the contacts 627 and 628. The circuit closer also involves means by which the shifting contact may have a step by step movement along the contact 627 then off that contact and onto the contact 628, there being one step or movement of the finger each time a space quad is cast, so that after a given number of quads are cast, the shifting contact may disconnect the space pin from one of the contacts 627, and connect it to the contact 628. The circuit closer finally comprises means by which the initial position of the shifting contact 625, relative to the contacts 627 and 628 may be set in each instance to determine the number of steps necessary to the shifting contact to carry it off of the contact 627 and onto the contact 628, or to determine whether or not the contact 625 shall engage the contact 627, at all. In the example already cited, the justifier will be set, so that the six unit mold stop terminal magnet is selected by the sliding finger 612 and connected to the contact 627 of the circuit changer, while the seven unit terminal is selected and connected to the other circuit changer contact 628. The shifting contact 625 of the circuit changer will be set relative to the first contact strip 627 so that seven movements of the finger will carry it from the six to the seven unit contact.

The circuit changer of the casting machine may be set in any one of ten setting positions, so that a maximum of nine quads of one size may be cast before the circuits are changed. It will be understood, of course, that after the change, any number of quads of the other size may be cast, as the contact finger 625 may remain stationary on the second contact 628, after it has exhausted its nine movements. If, therefore, there be nine or less than nine of each of the two sizes of space quads to be cast, it is immaterial so far as the capacity of the circuit changer alone is concerned, which of the two sizes be cast first, since the circuit changer may be so set that the contact finger will not reach the changing position, until all of the quads of one of the sizes are cast. Where, however, there are to be cast more than nine quads of one size, but nine or less quads of the other size, the quads of the latter size are cast first, whether they be of the larger or of the smaller unit size. If, for instance, forty-one units of justification are to be distributed among fifteen spaces, eleven of the space quads would be of seven unit body, and the other four of six unit body. It is apparent that any effort to cast the seven unit quads first must fail, because the circuit changer, with its maximum of nine movements before a change, would after its ninth movement cause the machine to begin casting six unit quads. If, however, the four six unit quads be cast first, it is only necessary to set the changer, so that on the fourth movement, it will reach its circuit changing position (see chart, Fig. 48). After that the desired eleven seven unit quads may be cast because the contact finger will remain on the second contact, regardless of the number of spaces in the line. Where, then, more than nine quads of a size are required, this size must be cast last, regardless of the fact, that it may be an odd or an even unit size. We have seen, however, (see Figs. 54 and 55) that the even unit mold stop terminals are arranged in one row 602, and through a sliding finger 612, may have a connection to the first of the center strip 627 of the circuit changer, whereas, the odd unit mold stop terminals are similarly connectible to the second contact strip 628 of the circuit changer. It is, therefore, apparent that where more than nine space quads of even unit size are called for, the connections from the rows of mold stop terminals to the contacts 627 and 628 of the circuit changer must be reversed. To effect this reversal, when the occasion demands, the justifier therefore comprises a second circuit changer 666 (see Fig. 54). The operation of this second circuit changer to determine the order in which the sizes are cast is governed by the row #13 punch in the composing machine. The function of the row #13 hole, when presented at the index head of the casting machine when the switch 429 is on the setting circuits is to close a circuit controlling the second circuit changer 666, thereby moving the latter to reverse the connections to the first circuit changer so that the normal order of casting the odd and even unit quads is reversed. When no row 13 hole is presented, the sizes are cast in the order fixed by the normal connections from the rows of mold stop terminals to the circuit changer.

It occasionally happens, when the number of spaces are greater than nineteen, that more than nine quads of each size are required. It is apparent that when such is the case, the capacity of the circuit changer is overreached, no matter which size be first cast. An attempt to distribute fifty units of justification to twenty spaces is an instance of the last character. Here ten quads should be of seven unit body and ten quads of six unit body. Before either the ten seven-unit quads or the ten six-unit quads could be cast, the contact finger of the circuit changer would pass onto the second contact and change the circuit. Such a justification is impossible (see chart Fig. 49) with the machine constructed as shown in the drawings.

Mention has been made of two instances of impossible justification, the first, when the relation of the total amount of justification to the number of spaces is such as to call for space quads of a size greater than the mold capacity of sixteen units; and the second, where the number of quads of each size required is greater than the capacity of the justified circuit changer. These conditions have been mentioned, not because they present any serious problem in the successful operation of the machine, but merely that the operation of this machine in its relation to the composing machine may be fully understood. As a matter of fact, the instances mentioned are rare, as will be seen upon reference to the chart forming Figs. 46–49 of the drawings. Where such instances do occur, however, they are disclosed to the operator at the composing machine, as presently to be described, as soon as he depresses the justification key. He has then merely to fill in at the end of the line, or to cancel and re-write the line, so that the amount of justification is changed.

The setting of the fingers 611 and 612 on the contacts 601 and 602 of the justifier of the casting machine, is determined by a double row of electromagnetically controlled stops 618. The circuits of the stop magnets are in turn controlled by holes punched in the tape by the "row" magnets of the composing machine. Only one of the punch magnets need, however, be operated for any desired setting of both of the fingers 611 and 612, and, when these fingers are set upon the end contacts 4 or 16, then no punch hole at all is required, because in such instance the end or stationary stops 618 are used.

The setting of the circuit changer contacts 627 and 628 (see Fig. 54) to determine how many space quads shall be cast of each of the two sizes selected by the stops 618, or to determine whether any or all quads shall be of one size, is likewise controlled by a set of stops 639. The slide 626 which carries the contacts 627 and 628 to give the same an initial setting with respect to the shifting finger 625, has attached to it a lever adapted to sweep over the bank of stops 639, and to be arrested by any of one of said stops which may be elevated. According to the stop 639 elevated, the slide 626 may be so positioned with respect to the finger 625 that the latter may rest at once upon the contact 628, as when all quads are to be of a size, or may rest at any point on the contact 627, according to the desired number of movements in each instance required of the finger to carry it to the contact 628, as when a certain number of one size of quads and then a number of another size are to be cast. The stops 639 are electromagnetically controlled from the index head of the casting machine by holes punched in the tape by one or another of the "individual" punch magnets in the present composing machine. Here again but one "individual" punch magnet is required for any setting, and when the end or stationary stop 639 is used, no "individual" punch hole at all is required.

The setting of the second circuit changer 666 for reversing the normal connections from the sliding contacts 611 and 612 to the contacts 627 and 628 of the first circuit changer, is controlled by a stop pin 675. Whenever the justifier is set a spring 673 tends to move the circuit changer 666 to a position where the finger 612 is connected to the contact 627 and the finger 611 to the contact 628. The pin 675 when operated however, holds the circuits against the action of the spring 673, in such a position that the connections are reversed. This pin 675 is electromagnetically controlled from the index head to operate whenever a hole punched in the tape by the #13 "row" magnet of the present composing machine presents itself.

It has been stated that but a single perforation in the tape is required for the operation of each pair of setting pins 618 in the casting machine. That two punch holes are not required to operate two pins is due to the fact that the stop magnets 623 are coupled in pairs, in series, as shown in diagram in Fig. 55. Each magnet is in circuit with the magnet representing the next ascending or descending unit value of space quad. It is at once apparent from the connections shown in Fig. 55, that even in those instances where all the quads of a line are to be of one size, so that but one mold stop, is wanted, nevertheless, two mold stop setting pins 618 are operated. Where all quads are to be of a size, however, but one of the mold stops so set is in fact used. In such instances, the stop to be used is connected to the circuit changer contact 628, and the other stop to the contact 627, whereupon the circuit changer shifting contact 625 is at once set upon the contact 628, so that the stop connected to the contact 627 is never operated.

Referring to Fig. 55, the circuits of the magnets 623 are indicated as "R—1" to "R—12", inclusive, and the magnets therein are marked according to the unit value of the mold stop controlled by each. The circuit of row #13 magnet 678 is marked "R—13". In the first and fourth columns of a table shown in Fig. 56, there are enumerated all the combinations of two stops available, where the space quads are to be of two sizes. The stops appear in each combination in the order in which the space quads are to be cast, when that combination is employed. For instance, the first combination of the first column, "4 & 5," is the combination used where four unit quads are first to be cast, and thereafter, five unit quads. On the other hand the combination "5 & 4" at the head of the fourth column is the combination to be used where five unit and thereafter, four unit quads are desired. In the columns marked "Use" are enumerated the circuits, "R—1" to "R—12" of Fig. 55, the numeral for each circuit being set opposite the particular combination of stops in that circuit. At intervals in the columns marked "Shift," is the symbol "R—13." Wherever the symbol "R—13" appears in the table, the combination of stops denoted opposite the same, can be obtained only by the use of the row #13 magnet 678, to reverse the normal order of operation of the selected mold stop magnets. This symbol, it will be noted appears opposite every combination in which the stops 618 numbered 5, 7, 9, 11, 13 or 15 are first to be used.

Just as the table of Fig. 56 discloses in each instance the circuits employed where space quads of two certain sizes are to be cast, so a second table (Fig. 58) discloses the circuits employed where all quads in a line are to be of one size. The stops 639 are diagrammatically shown in Fig. 57, the first stop being marked "1—8" and the other stop being marked from "1—1" to "1—9" and "Dead." In the fourth column in Fig. 58, after each of the markings "All 4 in" to "All 16 u" inclusive, there, therefore, appears the same symbol "1—8," meaning that whenever all quads are to be of a size, the circuit "1—8" is to be used so that the finger 625 may be set in the first instance upon the contact 628.

In the third column of Fig. 58, the symbol "R—13" appears at intervals, indicating the use of the row #13 magnet circuit to reverse the normal connections of the sliding contacts 611 and 612 to the contacts 627 and 628. Whereas, however, in the table of Fig. 55, the "R—13" appears opposite all combinations in which the odd unit comes first, in Fig. 58, on the contrary, the "R—13" is set opposite those combinations, in which even unit first appears. This difference is due to the fact that the purpose of the reversal indicated in Fig. 55, is to invert the normal order of operation of the stops, so that the odd unit stop is first, and the even unit stop last, operated, whereas, on the other hand, the purpose of the reversals indicated in Fig. 58 is to eliminate the odd unit stop and to make the even unit stop the first, and only stop operated.

In Fig. 59 is yet another table. This table indicates the justifier lever stop circuits (see Fig. 58) used to time the shift from one to the other size of two desired sizes of quads. If, for example, there are to be four six-unit quads and then a number of seven-unit quads, the shift must take place after the fourth quad is cast. Upon reference to table 59, it will be seen that, to effect the shift at that time, the justifier lever circuit "1—4" is employed. Each of the circuits "1—1" to "1—9" is controlled by a different index pin 46. It appears then that a justification record may consist of one, two or three perforations in the record tape, to wit; one perforation for the selected justifier setting pins 618, except where the stationary end stops 4 or 16 are used; one perforation for the circuit of the selected justifier lever stops 639, except when the "Dead" stop #9 is used; and one perforation for the "R—13" magnet, whenever the latter is needed.

In Figs. 50, 51, 52 and 53 is a chart showing the circuits required for any justification of from one to sixty-four units, with from one to twenty spaces in the lines. The justification numbers are here again arranged horizontally at the top of the chart, and the space numbers vertically at the side of the chart. The figures or symbols within the columns are from one to three in number, according to the number of justification circuits required in each instance. In the first of the three spaces assigned to each justification is a number representing one of the justifier lever stop circuits "1—1" to "1—9" (see Fig. 58), the circuit "1—1" being represented by the numeral "1" and the circuit "1—2" by the numeral "2" etc. Where no numeral appears in the first of the three spaces, it signifies that the "Dead" stop (see Fig. 58) is the stop employed. The second of the three spaces is assigned to the numeral "13" representing the circuit of the row #13 magnet. When no numeral appears in the second space, the row #13 magnet is not operated. The third or last space assigned to each justification is reserved for the numerals representing the circuits "R—1" to "R—12" (see Fig. 55) of the setting stop pin magnets 623, the circuit "R—1" being represented by the numeral "1;" the circuit "R—2" by the numeral "2," etc. When no numeral appears in the third space, it signifies that one of the stationary stops 4 or 16 (see Fig. 55) is used.

To demonstrate the utility of the chart; suppose, for example, we wish to know what circuits are to be used when forty units of justification are to be distributed to four spaces. In this case, ten units must be added to the normal four unit body of each quad, making each space quad of fourteen unit body. This distribution is verified upon reference to Fig. 48, where the justification is found to be represented by the numerals 0—14—14, indicating all 14s with no change. Referring now to Fig. 58, we find that the 14 unit stop is in the circuits "R—10" and "R—11" with the 13 and 15 unit stops, respectively. Since in this instance, all quads are to be of 14 unit size, it is immaterial whether the R—10 or R—11 circuit be selected, because in neither event will the 13 or the 15 unit stop be used. We may, therefore, select the circuit "R—10". To cut the 13 unit stop out of operation, it is necessary, however, that the circuit changer member 625 be set in the first instance on the contact 628. This, as has been pointed out, is effected by the use of the justifier lever circuit "1—8". Since, however, the row 602 of even unit stops, is normally connected to the circuit changer contact stop 627, it is apparent that if the 14 unit stop is to be used from the contact 628, then the row 13 magnet must be operated. Thus, we find that the circuits required in this example are "R—10" and "R—13", Fig. 55, and "1—8", Fig. 58. Referring now to the chart (Fig. 52) under the justification numeral 40 and opposite this space number 4, we find the figures 8—13—10. These it will be seen, correspond precisely with the circuits just found.

*Justification mechanism of the composing machine.*—It appears from the foregoing that the operator at the composing machine punches one, two or three holes in the record strip whenever he justifies a line. It is the purpose of this machine to punch all the necessary justification holes by the depression of a single key. Each justification key must, therefore, control the circuits of the one, two, or three punch magnets in each instance required to be operated.

Referring to Figs. 1, 2, 20, 21, 24, 25 and 27, the justification keys, sixty-four in number, are shown arranged in four rows in a justification key-board 4, and (see Fig. 25) are numbered from 1 to 64. There is, therefore, a key for every one of the justification readings on the dial 43. The operator to punch in the tape the proper justification record merely notes the justification reading of the needle on the dial 43 at the end of the line and depresses the justification key bearing that same reading. He takes no note of the number of spaces in the line, and a register to give a visible indication of the same is unnecessary. It will be observed, however, upon reference to the tables (Figs. 50–53) that the number of spaces in the line is a vitally essential element of any justification, and that unless the justifier in some way takes the same into account, it must be inoperative. In the present machine, therefore, the spaces are recorded. The space recording mechanism acts automatically to present a different set of punch magnet connections to each of the justification keys every time a space is recorded, so that when the last space is recorded and the line ready to be closed, it is only necessary to select the key representing the total amount of justification to be distributed to the number of spaces already automatically determined by the machine.

The justification keys project through the key-board 111 and connect each to one of a number of levers 112, pivoted on the lugs 113, depending from a board 114. The keys are normally elevated by means of springs 115, engaging the levers 112. Since each justification key is designed to close the circuits of one, two or three punch magnets according to circumstances, each of the levers 112, carries three contact strips 117, 118 and 119 (see Fig. 21). Referring to Fig. 27, it will be seen that the levers 112 are of such length and so positioned that the several contacts 117, 118 and 119 of all the keys are in alinement to form a bank of sixty-four sets of three contacts each. Rotatably mounted on an axis 120 below the justification key-board is a cylinder 121. Around the face of the cylinder are sixty-four rings of contact pins 122, each of such rings of contacts being disposed in a vertical plane with one of the levers 112, so that when any lever 112 is depressed, the contacts 117, 118 and 119 thereon engage with such of the pins 122 as may be directly under the same. Each ring of contact pins 122 may be considered as composed of twenty sets of from one to three contact pins 122 each. In each ring of contact pins 122, there are, therefore, as many sets as there are spaces denoted in the chart of Figs. 50–53. The pins 122 in each set furthermore accord in number and position to the figures in the corresponding subdivision of the chart. Each of the pins 122 is connected to some particular "row" punch magnet or to some "individual" punch magnet or to the row #13 punch magnet, according to indications on the chart. Every time the space bar 8 is depressed the cylinder 121 is rotated a step and then stopped. When the cylinder is stopped and a justification key depressed, the contact strip 117 will establish a connection to the particular "individual" punch magnet denoted in the first of the three chart spaces which are assigned to the combined justification number on the key depressed and space number corresponding to the step movements theretofore made by the cylinder. Where the first of the three selected chart spaces presents a blank thereby indicating the use of the stationary justifier lever stops 639, no pin 122 will be found by the strip 117. Similarly, the contact strip 118 will, when depressed, establish a connection to the row #13 punch magnet, except where the chart shows a blank for that combination, in which instance, no pin 122 will be found by the strip 118. Again the contact strip 119 will establish a connection to the row punch magnet indicated in the last of the three selected chart spaces, except where either of the stationary stops 4 or 16 of the justifier setting pins 118 is to be used, in which instance, a blank appears in the third chart space for that combination and no pin 122 will be found by the contact strip 119.

At each end of the cylinder 121, as will be seen upon reference to Fig. 24, there is a commutator or collector 123 and 124. The sections of commutator 123 are each connected to one of the bank of mercury wells 124' (see Fig. 22) in the base of the cylinder frame and thence to one of a set of terminals 125, marked "Ind" (see Fig. 26). The sections of the commutator 124 are similarly each connected to one of a bank of terminals 126, marked "Row", (see Fig. 26). Each of the terminals 125 is connected as presently to be described to one of the "individual" punch magnets, and each of the terminals 126 to one of the "row" punch magnets. Each contact 118 is connected through its corresponding pin 122, when such pin exists, to a section of the collector 124, and thence to the row terminal marked 13 in Fig. 26, and to the row punch magnet #13 in Fig. 37. The contacts 117 are connected through the pins 122 to the sections of the collector 123, and the contacts 119 through the pins 122 to the sections of the collector 124, whenever upon depression of the justification keys the requisite pins 122 are found.

The spring drum is driven step by step by a spring 128 attached at one end to the drum and at the other end to the drum axle 120 (see Figs. 20 and 28). The action of the spring 128 is controlled by an escapement mechanism consisting of a ratchet wheel 129, and a pawl 130. The pawl 130 is carried on the end of a lever 131, in turn connected to the armature 132 of the magnet 133, whereby upon each energization of the latter, the ratchet wheel 129 is released, and the cylinder carried a distance corresponding to one of the teeth or steps in the ratchet wheel 129, whereupon, it is again arrested by the pawl 130. This amount of rotation also corresponds to the mean distance between the sets of pins 122 around the circumference of the cylinder, and thus at each movement of the cylinder, a new set of pins 122 is presented to each of the key levers 112. The circuit of the magnet 133 leads to a pair of terminals marked "SP" (see Fig. 26), and thence by circuits hereinafter to be described, to the space key on the character key-board, so that, upon each depression of the space key, the cylinder is rotated one step. In this way, the number of spaces occurring in any line of composition or in any given section of a line is automatically registered by the rotation of the cylinder.

It has been pointed out that occasionally a combination occurs which makes justification impossible. It is desirable that the operator be notified when this condition exists, and to this end, the following means is provided. In the circuit of the lamp 85, employed as a signal to notify the operator that he is within justification limits of the end of the line, is a circuit maker and breaker 136 (see Figs. 4 and 26). This circuit maker and breaker consists of a contact arm or member 137 carried by the armature 138 of the solenoid 139. A spring 140 holds the solenoid armature normally in such a position that the member 137 closes, or rather sets, the lamp circuit at this point, so that the lamp may be lighted when the circuit is completely closed by the movement of the slide across the contacts 89 and 90 as heretofore described in connection with the unit register. The solenoid magnet is connected to one of the sections of the commutator 124. Whenever the total amount of justification to be distributed, (as indicated on the corresponding justification key) and the number of spaces to which such justification is to be distributed (as indicated by the rotation of the cylinder), together present a combination shown by the chart to be impossible, then the depression of the justification key establishes a circuit to solenoid 137 through that section of the commutator to which the solenoid is connected. The pins 122 of all those combinations which are impossible are connected to this same commutator section for the solenoid instead of to those of the commutator sections which lead to the punch magnets. The attempt of the operator to record any impossible justification therefore at once extinguishes the lamp 85.

At the completion of each line, or in case of multiple justification at the completion of any desired section of a line, it is necessary that the cylinder 121 be returned to the zero position for the justification of the next line, or section thereof. For this purpose, the cylinder, in addition to the ratchet wheel 129, carries a pinion 141. This pinion is engaged by a rack 142. As the cylinder is advanced step by step by the escapement of the spring 128, the pinion 141 is turned and the rack 142 raised. The rack 142 carries the key 76 controlling the release magnet 75 of the unit register. The depression of the key 76, not only releases the needle 7, and thereby allows the latter to be returned to zero, but also by means of the rack 142 and pinion 141 returns the justification cylinder 121 to its zero position.

In order that the depression of the key 76 may effect the release of the unit register needle 7, one of the terminals of the release magnet is connected by means of a circuit to be hereafter described, to a binding post and terminal 143 at the end of the justification cylinder (see Figs. 22 and 23). Mounted on the cylinder frame adjacent the binding post 143 is a bell crank lever 144. One arm of the lever 144 carries a contact 145 also in the circuit of the release magnet 75. In one position of the lever 144, the contact 145 is adapted to engage the opposing contact 143, and close the circuit of the magnet. The contacts 143 and 145 are normally held apart by reason of a spring 146 engaging the lever 144 to hold it in the position shown in Fig. 23. The other arm 147 of the lever 144 extends substantially perpendicular to the rack 142 on which the key 76 is carried. This arm 147 has a shoulder 148, adjacent the rack 142, and resting on the shoulder 148, in contact with the rack 142 is a clutch or loosely supported cylindrical member 149. The shoulder 148 is so shaped that, as the rack 142 ascends in response to the successive operations of the cylinder 121, the member 149 merely turns loosely on its bearings. When, however, the key 76 and rack 142 are depressed, the clutch member 149 is wedged tightly against the rack and binds the latter to the arm 147, so that the bell-crank lever 144 is turned against the action of the spring 146, and the circuits of the release magnet and of the trip magnet of the perforator are closed by the engagement of the contacts 143 and 145.

*Strip punching and feeding apparatus.* Figs. 1, 2, 30, 31, 32, 33, 34, 35, 36 and 37.— The strip punching apparatus, indicated at 5, consists of two rows of punch pins, one row of which is operated by the so-called "individual" punch magnets, and the other row of which by the so-called "row" punch magnets. The magnets are all alike in structure and in function so far as the mere punching of the paper is concerned. The holes punched differ however, as we have seen, in the function performed by each in the casting machine, and, as we have also seen, the "row" magnets are in circuit with the stop magnets 53 of the unit register, whereas, the "individual" magnets are not.

Referring now to Fig. 30, the "row" and "individual" punch magnets 150 and 151 have an armature 152, fulcrumed on the support 153. At the center of the support 153 (see Figs. 30 and 31) is a standard 154. Mounted to have a vertical sliding movement in cross pieces 155 and 156 on the standard are the punch pins 157. At their upper ends, these pins pass through openings in the base of a guide-way 158, through which guide-way the tape or strip is fed. The punch pins are normally held out of the path of the paper by coil springs 159. In order that the arrangement of the pins may be compact, and still provide room for the springs 159, some of the springs are arranged between the cross piece 156 and the paper guide-way, and the others between the cross piece 156 and the cross piece 155. At their lower ends the pins protrude a slight distance through the cross piece 156, and, as shown, each pin terminates directly over one of the armatures 152 of the punch magnets. When, then, any punch magnet is energized, the corresponding punch pin is urged upward through the guide-way 158, and through the paper in the guide-way. In order that the hole thus punched in the paper may be clearly cut, the pin on this upward movement passes also into a die 160' in the top 160 of the guide-way. Over the top 160 of the guide-way, and extending down along the side of the punch-pin standard, is a receptacle or chute 161 for catching and conveying away the particles punched from the paper.

In addition to the pins for punching the character, the justification and certain other symbols in the strip, there is a pin for punching along the margin of the strip a row or series of holes to be used as a means for feeding the strip through the casting and setting machines. The device for punching these feed holes, and also for feeding the strip through the guide-way will now be described. Disposed centrally of the punch magnets is a feed magnet not shown in Fig. 30, but indicated at FD in Fig. 37. The armature 159 of the feed magnet, upon each impulse, gives a vertical reciprocatory movement to a rod 162, (see Fig. 32). This rod passes through the table 153, and is attached at its upper end to a cross-pin 163, which is in turn attached to a cross head or sliding member 164. A vertical rod 165 is secured to the cross head 164, and by means of the arm 166, at the upper end thereof, carries the feed hole punch 167, the latter being guided at its upper end in an opening 168 in a part of the fixed standard, and at its lower end in an opening 169 through the top 160 of the strip guide-way. A coil spring 170 embracing the rod 165 and located between a collar on the latter and the part 171 of the standard, serves to return the arm 165, with the cross head 164, to its upper position after each impulse of the feed magnet. A cross piece 172 on the cross head (see Fig. 35) by means of which the rod 165 is secured to the cross head, is also attached at its other end to a second spring 173. This spring 173 is attached at its upper end to the arm 174 on the standard, whereby it works in conjunction with the spring 170 to return the cross head after the action of the feed magnet. By reason of having two springs, one on either side, any binding of the parts is avoided, and the action made more certain. As will be seen upon reference to Fig. 32, the cross piece 172 of the cross head also carries a bent member 175 having near its upper end a horizontally projecting pin 176. As will be seen upon reference to Fig. 2, the paper strip is fed downward from the supply roll under the pin 176 and back over an idler 177, then forward through the guide-way of the punching apparatus. Each downward movement of the cross-head in response to the magnet, therefore, operates by reason of the pin 176 to draw on the paper strip, and to provide enough slack therein for the succeeding feed of the same through the guide-way.

Mounted to the rear of the cross-head 164 (see Figs. 31, 35 and 36) is a second cross-head 178, having at its lower end an outwardly turned lip 179 and a slot at 180 for the passage therethrough of the rod 162, which operates the cross-head 164. At the upper end of the cross-head 178 is a shoulder 181, also in the path of the cross-head 164. The cross-head 178 has also a semi-cylindrical projection 182 to the rear thereof, and through the projection 182 extends a rotatably mounted pin 183 (see Figs. 31, 32, 35 and 36). The pin 183 carries at its forward end a member 184 having a bell-crank conformation. One arm or portion 185 of the bell-crank member 184, when the cross-heads are in the position shown in Fig. 32, projects into the paper guide-way, and it is serrated at its edge to engage the paper in the guide-way and to feed the latter forward upon being rocked. The other portion or arm 186 of the member 184 projects into the path of the lug 187 on the cross-head 164, so that when, upon the upward movement of the latter, the lug 187 strikes the arm 186 of the member 184, the latter is rocked on its pivot pin 183. A light coil spring 188 (see Figs. 31, 35 and 36) tends to rock the bell-crank member 184 in a direction reverse to that in which the latter is rocked by the lug 187.

The action of the feed hole punch pin, and of the strip feeding device 184 is as follows: The normal position of the parts assumed by virtue of the springs 170 and 173 after each impulse of the magnet is that shown in Figs. 32, 33 and 35, in which the punch pin 167 has been withdrawn from the paper, and the paper fed forward by movement of the member 184, the extent of movement of the latter having been determined by a stop 189. Now, when the rod 162, in response to the magnet, commences to descend, it carries with it the cross-head 164. By reason of the distance between the lower end of the latter and the lip 179 of the cross-head 178, the cross-head 178 is not at first moved, but continues to remain in the position shown in Figs. 32 and 33. Although the lug 187 of the cross-head 164 passes out of contact with the arm 186 of the feed member 184, the latter does not at once rotate under the action of its spring 188, for the reason that the frictional engagement of the arm 185 of the member 184, caused by the upward exertion of a spring 190 (see Fig. 31) is too great to be overcome by the slight strength of the spring 188. Consequently, the paper is held securely by the arm 185 of the feed member, while the feed-hole punch pin 176 traveling on with the cross-head 164, passes down and through the paper. Presently, however, after the punch pin has perforated the paper, and while the paper is now securely held by the feed-hole punch pin, the lower end of the cross-head 164, continuing down, strikes the lip 179 of the cross-head 178, and draws the latter down against the resistance of the spring 190. As soon as the cross head 178 commences to descend, the arm 185 of the feed member 184 is drawn out of engagement with the paper, and is then free to be forced by the light spring 188 into the position shown in Fig. 34, in which position it remains until the two cross-heads reach the lower end of their paths of movement.

The armature of the feed magnet, now being released by the latter, the rod 162 and the cross-head 164 are free to return to their uppermost position under the action of the return springs 165 and 173, and the cross-head 178 urged by the spring 190, follows the upward movement of the cross-head 164. The cross-head 178, carrying with it the feed member 184, and the latter, by reason of the spring 188, being in the position shown in Fig. 34, comes into contact with the paper before the feed hole punch pin 167 moving upward with the cross-head 164 is as yet entirely withdrawn from the paper. The cross-head 164 continuing farther upward causes the punch pin 167 to be withdrawn from the paper entirely, and then, continuing farther brings the lug 187 into contact with the arm 185 of the feed member 184. On further movement of the cross-head 164, the lug 187 rocks the member 184 into position shown in Fig. 32, and thus feeds the paper forward an amount determined by the position of the stop 189. The paper having been fed forward the requisite amount, and while being securely held by the member 184, as shown in Fig. 32, the selected punch magnets 150 are energized, causing the corresponding punch pins 157 to pass through the paper. These latter pins are immediately withdrawn by reason of their springs 159, and the paper is ready for another cycle of movements, such as just described.

*Slack preventer take-up device.*—It has been explained how the downward movement of the cross-head 164 causes the necessary amount of paper to be drawn from the supply roll for the feed through the paper guide. After the feed through the recording device, any slack in the tape beyond the same is taken care of by the following device. Referring to Figs. 1, 2, 38 and 39, there is shown mounted on the standard 191 just forward of the punch magnets, the take-up roll 192. This roll is in frictional engagement with, and is driven by the roll 193. The axle of the roll 192 is loosely mounted in slots 195 in the standard 191, and rests upon bearings which are pivoted to permit the roll 192 to be held out of gear with the roll 193. The driving roll 193 is mounted upon an axle 197, but is not, however, rigidly attached thereto. A coil spring 198 (see Figs. 38 and 39) attached at one end to the roll 193 and at the other end to the shaft 197, comprises the driving connection between the shaft and the roll. In order that the spring 198 may be conveniently located centrally of the roll 193, the latter is built in two sections 199 and 200, securely united by bolts 201. Before the parts of the roll 193 are thus united, however, the coil spring 198 is first placed in position and connected to the shaft 197, and to the inner periphery of one of the roll sections as shown in Fig. 39. By virtue of the spring connection of roll 193 with its driving shaft, the latter will be turned, or not, according to whether the frictional resistance of the take-up roll 192 on the outer periphery of the roll 193, is greater than the tension of the spring 198 within the roll. Where, therefore, the tape from the punching apparatus take-up roll 192 is tight and without slack, the friction between the roll 192 and the drive roll 193 will be such that the latter will not turn in response to the effort of the spring 198, but the spring 198 will only continue to be wound the more tightly by the rotation of the axle 197. The tape can never be torn, because as soon as the energy stored in the spring is sufficient to overcome the frictional engagement of the roller and the spool, and before such energy is sufficient to tear the paper, the roll will slip on the spool. Presently, however, if any slack occurs in the tape to the take-up roll, the tension of the spring 198 will cause the roll 193 to rotate the take-up roll 192 until the slack disappears again.

On the axle 197 of the roll 193 is a ratchet wheel 202, and engaging therewith is a pawl 203, mounted on the lever 204. To the lever 204 is connected an arm 205, in turn connected to the armature 206 of the magnet 207. By suitable connections hereafter to be traced, the magnet 207 is operated every time a character key, a space key or a justification key is operated, and is also energized when a feed key on the character key-board is depressed. The ratchet 202 is also engaged by a spring pawl 208 for holding the axle in position between the impulses of the armature lever 206.

*The circuits.*—The electric circuits by means of which the unit register, the justification mechanism, the punching mechanism, the strip feeding, and the various other mechanisms are operated, will now be described.

The current for operating the machine may be from any suitable source, such as a direct current lighting or power circuit. The terminals 210 and 211 (see Figs. 37 and 26) may be considered the points at which the machine circuit is plugged into the supply mains. The current entering the machine circuit at the terminal 210, passes by way of the wire 212 to the switch 6, shown on the face of the table in Fig. 1. The switch 6 controls the current to the machine, and is open when the machine is not in operation. When the switch 6 is closed, the current continues along the line 212 to a terminal marked "IN," and thence to the contact 25 at the rear of the character key-board. The line 212 is normally open at the contact 25, but, as heretofore mentioned, is adapted to be closed through the movable contact 24 upon depression of any character key or the space key. When so closed, the current passes by way of the line 217 into the frame 11 of the character key-board and through the key shafts 10 to the pins 12 and 13 at the lower extremity thereof. When any one of the character keys is depressed, so that the pins 12 and 13 enter the mercury wells 14 and 15, a double circuit is established, except when, as hereinbefore described, but one circuit is required. One branch circuit 214 leads from the mercury well 14 to one of the terminals 285 of a circuit changer or switch 274, located behind the key-board, the purpose of which will presently be described, and thence by way of the line 215 to one of a set of terminals marked "IND," whence by way of the line 216, the circuit is continued to one of the "individual" punch magnets 151. From the individual magnet, the circuit is continued by way of the line 217 through the negative terminal of the feed magnet and by line 218 to the negative outlet 211 to the supply mains. The other circuit closed by the character key extends from the mercury well 15 through the line 219 to one of the terminals of the switch 274, and from the switch by way of the line 220 to one of the terminals marked "Row," whence by line 221, the circuit is continued to one of the "row" punch magnets 150. From the punch magnet, this circuit is continued by line 222 to a terminal #10 on a switchboard, the purpose of which will presently be described, and from a terminal #8 on this switch-board by line 223 to one of the stop magnets 53 of the unit register. From the stop magnet 53, the circuit continues by way of a common return 224 to negative terminal 211 to the supply main. It will therefore be seen that whereas one of the circuits from the character keys includes an individual magnet only, the other circuit includes not only a row magnet, but also a unit stop-pin magnet. The theory of these connections have heretofore been fully explained, and need not again be discussed.

It will be remembered that in addition to the operation of the proper row and individual punch magnets, and of the proper stop magnet of the register, there is to be operated upon each depression of a character key, the following magnets, to wit, the king magnet 48, the lock magnet 103 for locking the needle 7 after each advance of the same, the feed magnet for feeding the tape and the slack preventer magnet 207. The circuits of the magnets will now be traced. These circuits, however, are not direct from the keys to the respective magnets, but are closed by means of relay magnets.

It will be noted that each operation of the contact 24 in the rear of the typewriter, in addition to closing the circuit 213 through the key-board, also closes a circuit 225. This circuit extends to the point 226 and there divides into two circuits 227 and 228. In circuits 227 and 228 are relay magnets 229 and 230 respectively. From the relay magnets 229 and 230, the circuits 227 and 228 extend to a point 231, where they re-unite and then continue by way of the line 232 and return line 226 to the terminal 211. At each operation of the contact 24, therefore, the relay magnets 229 and 230 are operated.

From the terminal "IN" in the line 212, there extends a branch 233 leading to a point 234, where it branches through the armatures 235 of the relay magnet 229 and armature 236 of the relay magnet 230. When the circuit through the armature 235 is closed by the operation of the relay magnet 229, the current proceeds by way of line 237 to the king magnet 48 of the unit register, and thence by way of the common return 224 to the terminal 211 to the mains. The king magnet is, therefore, operated every time the relay magnet 229 is energized, and the latter is energized every time the contact 24 on the character key-board is operated; or, in other words, every time either a character key or a space key is operated.

Returning now to the point 234 in the circuit 233, the other branch of this circuit is continued through the armature 236 of the relay magnet 230, when the latter is operated, and thence through the line 238 to the point 239, where it branches. From the point 239, part of its current passes through the line 240 to the magnet 103 (see Fig. 4) for locking the dial needle 7 after each impulse. From the lock magnet 103, the circuit 240 is continued to the common return 224 and to the terminal 211. From the point 239 in the circuit 238 of the relay armature 236, the other part of the current continues by way of the line 241 through the feed magnet "FD," which operates the rod 162 of the apparatus for feeding the tape and punching the marginal feed holes therein, (see Figs. 30, 31 and 32). From the feed magnet, this branch of the current then continues by way of line 218 to the terminal 211. It will thus be seen that every time the armature 236 of the magnet 230 is operated; or, in other words, every time the circuit of the relay magnet 230 is closed by the contact 24 on the rear of the character key-board, the dial needle is locked, and the ribbon fed forward a step. This occurs every time either a character key or a space key is operated.

The space key has several functions in addition to that of rotating the justification pin cylinder. It will be remembered that upon every depression of the space key, a space hole is to be punched in the tape and the normal space quad of four units registered on the unit register. The circuits by which the space key effects these last two results are as follows: Referring to Figs. 6 and 37, the space bar is shown to be supported on two shafts 28 and 29. A contact pin 253 on the shaft 28, when the space bar is depressed, dips into a well 254. The shaft 28 is connected through the key-board 11 with contacts 24 and 25 to the line 212. From the well 254, the circuit through the shaft 28 continues by way of line 255 to an "IND" terminal #8, and thence by the line 216 to the corresponding "IND" punch magnet, and by line 217 to the terminal 211. The other shaft 29 carries a pin 256 adapted to dip into a well 257 and to establish a circuit by the line 258 to a terminal marked "SP" and thence to a point 259, where this circuit is divided. One branch 260 leads to a punch magnet SP, and thence by line 261 to the 4 unit terminal at the switch 290. From this terminal the circuit is continued by a line 261' to the 4 unit stop magnet 53, whence the circuit is continued by the common return 224 to the terminal 211. Every time then that the space is depressed, two punch holes together comprising the space symbol are punched in the tape, and four units are recorded at the register. Also all those circuits including the king magnet, the lock magnet, the feed magnet, etc., are likewise closed, upon depression of the space key, as heretofore pointed out, by the movement of the contact 24. From the point 259 in the line 258, which leads from the space bar contact 257, a branch 264, leads to a terminal "SP," and thence through the cylinder escapement magnet 133, returning to the common return 224, and thence to the outlet terminal 211 to the supply mains. From a point 262 in the line 233, a branch circuit leads by line 263 to the circuit closer terminal 90, sliding contact 98, terminal 89, lamp 85, circuit closer 137 to the common return wire 224 and to terminal 211. This circuit leading directly to the switch 6 by line 233 and 212 is closed whenever the contact 98 closes the contacts 89 and 90.

The justification key-board frame is put into connection with the supply mains by the key marked "Feed." To establish a current through any of the justification keys, the "Feed" key must be held depressed while the selected justification key is operated. The circuit through the "Feed" key to the justification key-board is as follows: From a point 242 in the line 212 between the terminal "IN" and the contact 25, a branch line leads to a point 244, and is here again divided. From the point 244 one branch 245 leads to the contact 246 of the "Feed" key. When the "Feed" key is depressed the contact 246 engages a contact 246'. To the latter contact is connected the line 247, which leads to a terminal "FD," and thence direct to the justification key-board 114.

Below the justification key-board (see Fig. 37) is the cylinder 121 with its contact pins 122, registering with the contact strips 117, 118 and 119 of the justification keys. The manner in which the pins 122 are connected, one to an "individual" punch magnet, one to a "row" punch magnet, and one to the row #13 punch magnet, has been heretofore described in connection with Fig. 26. These connections are fully shown in Fig. 37, but need not be again traced.

The circuit through the magnet 133 for breaking the lamp circuit is also shown in Fig. 37. This circuit is not shown between the cylinder 121 and the terminal "IMP" in Fig. 37, because the particular pins 122, in this instance shown below the justification key, represent a possible justification.

With the punching of the justification record in the tape, the tape must be fed as with the punching of any other record. To accomplish this feed of the tape from a point 265 in the line 247, which is connected to the "Feed" key, there extends a branch 266 direct to and through the feed magnet "FD," and, by the common return 218 from the latter to the outlet terminal 211. Every time, therefore, that the "Feed" key is operated, the tape is fed a step forward.

*Closing the line.*—After the justification record has been punched, there normally remains but one more hole to be punched in the tape. This hole may be appropriately called the "Trip" hole, since when presented to the casting machine, it has the function of operating a trip in the latter machine. In the casting machine, it will be remembered, the same "row" and "individual" index pins control not only the matrix stops, but also the justification stops. To enable these pins to have both of these functions, there is provided in the casting machine, a switch 429, (see Fig. 54) by means of which the pins may be connected to the matrix stops during the casting and setting up of type, and, thereafter, or before the casting of the next line or justified section of a line, may be disconnected from the matrix stops and connected momentarily to the justification stops, so that the justification mechanism may be set for the line or section of a line to follow. The trip in the casting machine is for the purpose of throwing the switch 429 and the trip hole punched in the tape after the justification record, therefore, prepares the casting machine for the reception of that justification record. It is, of course, understood that here, as in all monotype machines, the record is fed into the casting machine backward so that the trip hole is the first hole presented to the casting machine. The trip hole is punched in the tape by the depression of the key 76, which it will be recalled also returns the cylinder 121 to its zero setting and releases the needle 7 of the unit register, whereby the latter is likewise returned to zero setting. The circuit established by the key may be traced in Fig. 37 from a point 267 in the line 212, near the switch 6 by way of a line 268 through the contacts of the key 76 to one of the punch magnets marked "T R", and thence to the common return 218 and outlet terminal 211. From a point 269 in the line 268 a branch line 270 extends to the needle release magnet 75 returning by the common return 224 to the outet terminal 211 to the mains.

*Multiple justification.*—According to the nature of the composition, it is sometimes desirable to justify the line in sections, that is to say, to have several distinct justifications in a line, instead of having a single justification for the whole line. In the casting machine, the justification mechanism is normally and conveniently attached to those mechanisms which shift the completed lines to the galley, so that, while a completed line is being so shifted the justification may be simultaneously set for the next line. Where multiple justification is employed, the justification mechanism must, however, be free of the line shifting mechanism, except at the end of each line, when the two may again be conveniently locked to move together. To automatically actuate this end-of-line locking mechanism for multiple justification, a special hole is punched in the tape. This hole controls a circuit on the "setting" side of the casting machine, and so, like the justification holes must be followed by a trip hole in order that the trip may first be operated. When, therefore, multiple justification is to be had, there are to be punched in the tape at the end of every line in addition to the usual line closing trip hole, first, the special end-of-line slide lock hole, and then another trip hole. Of these three holes, two are punched by means of the "Mult. just." key, and then the key 76 is operated to punch the third one. The key 76 might be operated ahead of the "Mult. just." key, except for the fact that the operation of the key 76 does not feed the tape.

The circuit of the "Mult. just." key extends from a point 244 in the line 243 by way of line 248 to the contact 249 of the key. When the key is depressed the contact 249 engages a contact 250 connected to the line 247 from the feed key, whereby the operation of the "Mult. just." may operate the feed magnet. Below the contact 250 is another contact 271 from which there extends a line 272, joining the line 268 to the "trip" punch magnet.

The last of the trip holes, viz., that punched by the key 76, is the first to reach the casting machine and there it operates the trip in the usual way. The next hole, viz., the second hole punched by the "Mult. just." key, therefore, reaches the casting machine after the switch 429 is tripped, and while the switch rests in the "setting" contacts. This trip hole, therefore, does not operate the trip magnet, which is in one of the circuits on the working side of the casting machine, but is conveniently used on the setting side of the casting machine to operate the multiple justification lock magnet. Following this hole comes the trip hole first punched by the "Mult. just." key. This trip hole finds the switch 429 again on the working circuits, and, therefore, again trips that switch, whereupon the justification record which follows, sets the casting machine in the usual way.

*Matrix lay-out changing device.*—We have traced the circuits from the character key-board to the punch apparatus, and have shown how a character having a certain type body width is connected to a certain row punch magnet, and to a certain stop-pin magnet, whereby the proper width of type body may be reproduced in the casting machine, and the corresponding proportion of composition accredited to the character on the unit register. In addition, each character has been shown to be connected to a certain individual punch magnet, whereby any particular character is selected from other characters of the same type body in the matrix lay-out. We have stated, that for convenience and simplicity of construction, the characters are arranged on the key-board 2 as far as possible as on a typewriter key-board. Often, however, for special composition, and for other reasons, it may become desirable to change the matrix lay-out. If the body of a character be changed, that character must be connected with different "row" punch and stop-pin magnets. It is not desirable to change the position of a character on the key-board every time the body of that character is changed, or to change several characters because one must be changed: an operator having learned his key-board or lay-out should not be confused by changes in the positions of the keys, if speed and accuracy of work are to be had. For this reason, it is preferable that any change should be in the circuit connections instead of in the keys. On the other hand, any actual disconnection of the wires leading from a character key to a particular punch and stop-pin magnet, and the connection of the wires of such key to other magnets is a troublesome and impracticable operation to go through each time a change is desired in the lay-out. To meet this situation, we have invented a peculiar switch or circuit changing device 274 (Fig. 37) by means of which a change in the lay-out and a corresponding change in the magnet circuits may be effected while the characters on the key-board and the wiring are left undisturbed. Our device for accomplishing this purpose will be seen upon reference to Figs. 37, 40, 41, 42 and 43. It consists in the first place of a bank of twenty-eight metallic plates 275, insulated from one another by insulating plates 276, and in the form of a block with frame members 277 and 278 also of insulating material. Along the edge of each plate 275 and 276 is a row of twenty-eight holes 279 in the metallic plates, and a similar row of holes 280 in the insulating plates. The holes are so arranged that, when the plates are superimposed and in position, the holes in the plate above register with holes in the plate below, to the end that thirty metallic pins 281 may pass through and be carried in the bank of plates. The holes 279 through the metallic plates are of greater diameter than the pins, so that the pins do not come in contact with the metallic plates unless a special connection to the same is provided. As a matter of fact, each pin is specially connected to one plate and insulated from all the other plates. When a block is placed in the machine, each pin 281 dips into a mercury well 282 on the machine table (see the switch 274 in Fig. 37), and is thereby connected to one of the "row" magnets, or to one of the "individual" magnets. There is, therefore, a plate 270 for each punch magnet, "row" and "individual," to which plate one of such magnets is connected, when the block is in position in the machine.

Upon reference to Figs. 40 and 42, it will be seen that each plate, in addition to the holes 279, is provided with fifteen groups of thirty holes each, 283, one group for each of the fifteen rows of characters on the keyboard. Passing through the fifteen groups of holes 283, are fifteen groups of thirty metallic pins 284. The holes 283 are not all of the same size, but are of two sizes. One of these sizes is of greater diameter than the pins 284, so that where a pin 284 passes through a hole of the larger size, it does not make contact with the plate. The other size of hole 283 is such, however, as to cause the plate to be in contact with the pin 284. Each one of the thirty pins 284 is in contact with one of the twenty-eight plates 275 (and through the pins 281 and wells 282 with one of the punch magnets) and passes through all the other plates 275 without contact therewith. At their lower extremities 284, the pins pass through the lower member 278 of the block, and, when the latter is in position on the machine, dip into corresponding groups of mercury wells 285 in the frame of the machine (see Fig. 37, where one of such fifteen groups is shown).

Each of the wells 14 and 15 at the character keys is in electrical connection with one of the wells 285 at the terminals of the pins 284, as by lines 214 and 219 (see Fig. 37). The wells 14 and 15 of any particular keyboard character connect with two wells of that particular group of pins 284, which corresponds to the position on the lay-out in which the character in question is located. When, therefore, a switch 274 is in position, the character keys make connections through two of the wells 285, through two of the pins 284, through two of the plates 275, through two of the pins 281 to the magnets over the circuits described in connection with Fig. 37. The particular punches operated by any key depends upon the connections established through the plates 275 by the pins 284 and these in turn upon the disposition of the smaller sizes of the holes 283 in the plates.

There is a switch or block with its assembled plates, pins and established connections, for each matrix lay-out. When another or somewhat different lay-out is desired to be substituted in the machine for the one in use, the block 274 is bodily lifted from the machine, the pins 281 and 284 being thus removed from the mercury wells. The switch representing the new lay-out of matrix is then substituted. This operation of changing lay-outs is extremely simple. The laborious operation of changing the wiring, or the necessity of changing the position of characters on the key-board are entirely avoided.

*Switch for changing unit values of matrix rows.*—The character key-board carries a complete font or lay-out of character keys. The machine must, however, be capable of use for type of various styles or fonts, according to the requirements of the work in hand. The lay-out must therefore be subject to change to accord to changes in the unit value of the characters in the rows on the matrix. The adaptation of a composing machine to such changes in the lay-outs has heretofore presented serious problems.

In monotype composing machines, there exists as we have pointed out a certain definite relation between the punch pins and the unit register stop pins, whereby, whenever any punch pin is operated a certain definite number of units is recorded on the register dial. To avoid multiplication and simplicity of parts, the punch pins and unit stop-pins, so related, are in machines of the class operated through a single connection from the keys on the key-board. In the present machine, such connections, we have seen to be several electric circuits, each of which includes one punch pin and one unit stop pin. These circuits must be changed to accord to the changes in the lay-out of matrix. The type of one font or lay-out differ in unit of set from the type of another. Furthermore, the number of type of a given unit of set will differ with the different lay-outs. A given row in the lay-out may in one instance contain type of a certain unit of set, and in another instance, certain type of another unit of set. The relation of the row punch connections to the unit stop connections must, therefore, be different with each lay-out. For this reason, it is apparent, that the connections from the punch magnets to the unit stop magnets must not be fixed or permanent. To change such connections in the Goodson machines, it was necessary separately to disconnect and interchange the wires between the punch and the stop pin magnets. In other machines the difficulty has not been less. We have in the present invention, however, a means by which the connections may all be simultaneously changed to accord to any desired lay-out without in any way disturbing the wiring of the machine.

Mounted in a terminal board 286 (see Figs. 44 and 45) is a set of thirteen mercury wells 287, connected to corresponding mercury wells 288 in the frame of the machine. The wells 288 are each connected permanently to one of the unit stop magnets 53 (see Fig. 37). Also arranged in two rows in the terminal board 286 is another set of fourteen mercury wells 289. Each of the wells 289 is connected to one of the row punch magnets (see Fig. 37). Resting upon the board 286 is a switch or block 290. In the block 290 are carried a set of contact pins 291, each of which dips into one of the wells 287; and also a set of contact pins 292, each of which dips into one of the wells 289.

There is a block or switch 290 for every lay-out. According to the lay-out, each one or more of the pins 292 is connected to some one of the pins 291. The pins 292 are through the board 286 in connection with the row punch magnets and in the pins 291 with the unit stop magnets. Therefore, the connections between the pins 291 and 292 determine what unit stop magnet is to be in circuit with each row punch magnet, or in other words, how many units shall be registered by the needle 7, when any particular row punch magnet is operated. This last may differ with each lay-out. Without, therefore, disturbing any of the connections from the magnets to the board 286, the connections between the row punch and unit register stops are simultaneously changed by lifting one block 290 from the board 286 and substituting therefor another block.

What we claim is:

1. In a composing machine, type casting control means, a unit register, selecting means in connection with said control means and with said register, said unit register comprising a dial and an indicator needle, means for driving the indicator more than 360 degrees around the dial in one direction and means for driving the needle in a reverse direction to an initial position.

2. In a composing machine, type casting control means, a unit register, selecting means in connection with said control means and with said register, said unit register comprising a dial and an indicator needle, means for driving the indicator more than 360 degrees around the dial in one direction and means for driving the needle in a reverse direction to an initial position, and means for stopping the indicator in its reverse movement when it reaches the initial position.

3. In a composing machine, type casting control means, a unit register, selecting means in connection with said control means and with said register, said unit register, comprising a dial and an indicator needle, means for driving the indicator continuously a plurality of times around the dial in one direction, and means for returning the same to its initial position.

4. In a composing machine, type casting control means, a unit register, selecting means in connection with said control means and with said register, said unit register comprising a dial and an indicating needle, means for driving the indicator around the dial in one direction, means for driving the needle in a reverse direction, means adapted to obstruct and stop the indicator at some point of the dial when the indicator is moving in the reverse direction and means for removing said obstruction to permit the needle to pass such point of the dial when moving in the other direction.

5. In a composing machine, type casting control means, a unit register, selecting means in connection with said control means and with said register, said unit register comprising an indicating surface and an indicating number adapted to be moved over said surface, means for driving said member in one direction on said surface, means for driving said member in the reverse direction on said surface, and means for stopping said member in its reverse movement at some point of said surface, but permitting the member to move freely past said point in the other direction.

6. In a composing machine, type casting control means, a unit register, selecting means in connection with said control means and with said register, said unit register comprising an indicating surface and an indicating member, means for moving said member in either direction over said surface, and means for stopping the indicating member at some point of said surface when moved in one direction, but having movement to permit the passage of the member past said point when moving in the other direction.

7. In a composing machine, type casting control means, a unit register, selecting means in connection with said control means and with said register, said unit register comprising an indicating surface and an indicating member, means for moving said surface member relatively to each other in either direction, means operating to stop said relative movement in one direction when the member is at some point of the surface, but permitting said relative movement in the other direction past said point.

8. In a composing machine, type casting control means, a unit register, selecting means in connection with said control means and with said register, said unit register comprising an indicating surface and an indicating member, means for moving said surface and member relatively to each other in either direction, means operating to stop said relative movement in one direction when the member is at some point of the surface, but permitting said relative movement in the other direction past said point.

9. In a composing machine, type casting control means, a unit register, selecting means in connection with said control means and with said register, said unit register comprising an indicating surface and an indicating member, means for moving said surface and member relatively to each other in either direction, a sliding member operating to stop said relative movement in one direction when the member is at some point of the surface, but permitting said relative movement in the other direction past said point.

10. In a composing machine, type casting control means, a unit register, selecting means in connection with said control means and with said register, said unit register comprising an indicating surface and an indicating member, means for moving said surface and member relatively to each other in either direction, means in the path of movement of one of said elements to stop the same after a predetermined movement thereof in one direction, said means being movable from the path of said element to permit the latter to pass the stop when moving in the other direction.

11. In a composing machine, type casting control means, a unit register, selecting means in connection with said control means and with said register, said unit register comprising an indicator, mechanism for differentially driving the indicator, a gear attached to one of said driven and driving elements, two movable fingers attached to the other of said elements, said fingers being of a width to pass between the teeth of the gear and being so disposed with respect to each other and the gear that, regardless of the position of the gear, one of the fingers may always interlock therewith, and means for moving such fingers into interlocking engagement with the gear whereby the indicator may be driven from its driving mechanism.

12. In a composing machine, type casting control means, a unit register, selecting means in connection with said control means and with said register, said unit register comprising an indicator, mechanism for differentially driving the indicator, a gear attached to one of said driven and driving elements, a movable finger, and means for moving such finger into interlocking engagement with the gear to hold the indicator in fixed position after each impulse.

13. In a composing machine, type casting control means, a unit register, selecting means in connection with said control means and with said register, said unit register comprising an indicator, mechanism for differentially driving the indicator, a gear attached to one of said driven and driving elements, two movable fingers, said fingers being of a width to pass between the teeth of the gear and being so disposed with respect to each other and to the gear that, regardless of the position of the gear, one of the fingers may always interlock therewith, and means for moving such fingers into interlocking engagement with the gear to hold the indicator in fixed position after each impulse.

14. In a composing machine, type casting control means, a unit register, selecting means in connection with said control means and with said register, said unit register comprising an indicator, mechanism for differentially driving the indicator, a rack attached to one of said driven and driving elements, a movable finger attached to the other of said elements, and means for moving such finger into interlocking engagement with the rack whereby the indicator may be driven from its driving mechanism and electrically controlled means for releasing the rack from the finger.

15. In a composing machine, type casting control means, a unit register, selecting means in connection with said control means and with said register, said unit register comprising an indicator, mechanism for differentially driving the indicator, a rack attached to one of said driven and driving elements, a movable finger attached to the other of said elements, and a spring for moving such finger into interlocking engagement with the rack whereby the indicator may be driven from its driving mechanism and positively actuated means for releasing the rack from the finger.

16. In a composing machine, type casting control means, a unit register, selecting means in connection with said control means and with said register, said unit registed comprising an indicator, mechanism for differentially driving the indicator, means coöperating with the driven elements to lock the latter in fixed position after each driving impulse, and means between said locking means and the driving mechanism whereby the indicator may be released from the differential driving mechanism to be moved independently thereof.

17. In a composing machine, type casting control means, a unit register, selecting means in connection with said control means and with said register, said unit register comprising an indicator, mechanism for differentially driving the indicator, means coöperating with the driven elements to lock the latter in fixed position after each driving impulse, and means between said locking means and the driving mechanism whereby the indicator may be released from the differential driving mechanism to be moved independently thereof, and means for actuating said locking means at each impulse of the indicator.

18. In a composing machine, type casting control means, a unit register, selecting means in connection with said control means and with said register, said unit register comprising an indicator, mechanism for differentially driving the indicator, means coöperating with the driven elements to lock the latter in fixed position after each driving impulse, and means between said locking means and the driving mechanism whereby the indicator may be released from the differential driving mechanism to be moved independently thereof, and electrically controlled means for actuating said locking means at each impulse of the indicator.

19. In a composing machine, type casting control means, a unit register, selecting means in connection with said control means and with said register, said unit register comprising an indicator, means for differentially operating the indicator, a signal, and means for operating the signal after a predetermined operation of the indicator.

20. In a composing machine, type casting control means, a unit register, selecting means in connection with said control means and with said register, said unit register comprising an indicator, means for differentially operating the indicator, an electrically controlled signal, a contact maker and breaker in the circuit of the signal and movable with the indicator operating means, whereby the signal is operated after a predetermined operation of the indicator.

21. In a composing machine, type casting control means, a unit register, selecting means in connection with said control means and with said register, said unit register comprising an indicator, differential driving mechanism for the indicator, a worm shaft turned by said driving mechanism, a collar threaded to engage the worm and be moved thereby as the indicator is operated, and a signal operated by the movement of the collar after a predetermined operation of the indicator.

22. In a composing machine, type casting control means, a unit register, selecting means in connection with said control means and with said register, said unit register comprising an indicator, differential driving mechanism for the indicator, a worm shaft turned by said driving mechanism, a collar threaded to engage the worm and be moved thereby as the indicator is operated, an electrically controlled signal, and a circuit maker and breaker in the circuit of the signal connected to the movable collar to be operated thereby, so that the signal is operated after a predetermined operation of the indicator.

23. In a unit register for composing machines, an indicator, means for differentially operating the indicator, an electrically controlled signal, a contact maker and breaker in the circuit of the signal and movable with the indicator operating means, whereby the signal is operated after a predetermined operation of the indicator, a justification key board and a second contact maker and breaker in the signal controlling circuit operable from certain of the keys to change the signal when an impossible justification is attempted.

24. In a unit register for composing machines, an indicator, means for differentially operating the indicator, an electrically controlled signal, a contact maker and breaker in the circuit of the signal and movable with the indicator operating means, whereby the signal is operated after a predetermined operation of the indicator, a justification key board, a second contact maker and breaker in the signal controlling circuit, and circuits from the key board to said second circuit maker and breaker controlling the latter to change the signal when an impossible justification is attempted.

25. In a composing machine, an indicator, means for differentially operating the indicator, a space register, means for registering justification, a signal, jointly controlled by the space register and justification means so as to give notice of impossible justifications.

26. In a composing machine, an indicator, means for differentially operating the indicator, a space register, means for registering justification, a signal jointly controlled by the space register and justification means to give notice of impossible justifications.

27. In a composing machine, an indicator, means for differentially operating the indicator, a space register, means for registering justification, a signal, means for changing the signal from the space register and for operating the same from the justification means to give notice of impossible justification.

28. In a composing machine, type casting control means, a unit register, selecting means in connection with said control means and with said register, said unit register comprising an indicator, mechanism for differentially driving the indicator, a gear attached to one of said driven and driving elements, and a locking member carried by the other of said elements, said locking member having a movement in a plane perpendicular to the plane of said gear, and means for moving said locking member into engagement with said gear to lock said driven and driving elements.

29. In a composing machine, a space counter or register, comprising a rotary cylinder, means for rotating the cylinder a predetermined distance when a space occurs in the line, means for recording justification, and means controlled by said rotary cylinder whereby the justification recorded is dependent upon the position of the cylinder.

30. In a composing machine, a space counter or register comprising a rotary cylinder, means for rotating the cylinder a predetermined distance when a space occurs in the line, means for recording justification, connections to the justification recording mechanism for operating the latter, said connections being in turn controlled by the cylinder so that the justification recorded depends upon the position of the cylinder.

31. In a composing machine, a space counter or register comprising a rotary cylinder, means for rotating the cylinder a predetermined distance when a space occurs in the line, means for recording justification, electrical connections to the justification recording mechanism for operating the latter, said connections being in turn controlled by the cylinder so that the justification recorded depends upon the position of the cylinder.

32. In a composing machine, character keys, keys representing the possible amounts of units of justification, means controlled from the keys, for effecting the registration of character and justification symbols, the justification controlling means comprising a drum rotatably mounted and connected with the space key to be turned progressively as the latter is actuated, and having arranged in sets on its surface connections to the aforesaid means for effecting the registration of the justification symbols, connections from the justification keys to the drum to coöperate with the connections on the latter, each progressive movement of the drum as the spaces are registered causing a different set of the connections thereon to be presented to the justification key connections, whereby finally upon actuation of the proper justification key, the amount of justification thereby represented is distributed to the number of spaces indicated by the movements of the drum, and the justification symbol for each distribution registered.

33. In a composing machine, character keys, keys representing the possible amounts of units of justification, means controlled from the keys, for effecting the registration of character and justification symbols, the justification controlling means comprising a drum rotatably mounted and connected with the space key to be turned progressively as the latter is actuated, and having arranged around it in sets connections to the aforesaid means for effecting the registration of the justification symbols, connections from the justification keys to the drum to coöperate with the connections on the latter, each progressive movement of the drum as the spaces are registered causing a different set of the connections thereon to be presented to the justification key connections, whereby finally upon actuation of the proper justification key, the amount of justification thereby represented is distributed to the number of spaces indicated by the movements of the drum, and the justification symbol for such distribution registered.

34. In a composing machine, character keys, keys representing the possible amounts of justification, means controlled from the keys for effecting the registration of character and justification symbols, the justification controlling means comprising a rotatable member connected with the space key to be turned as the latter is actuated, and having arranged around it in sets, connections to the aforesaid means for effecting the registration of the justification symbols, connections from the justification keys to the rotatable member to coöperate with the connections at the latter, the movements of the rotatable member as the spaces are registered causing different sets of the connections thereon to be presented to the justification key connections, whereby finally upon actuation of the proper justification key, the amount of justification thereby represented is distributed to the number of spaces indicated by the movements of the rotatable member, and the justification symbol for such distribution registered.

35. In a composing machine, character keys, keys representing the possible amounts of justification, means controlled from the keys for effecting the registration of character and justification symbols, the justification controlling means comprising a pivotally mounted member connected with the space key to be turned as the latter is actuated, and having arranged around it in sets, connections to the aforesaid controlling means for effecting the registration of the justification symbols, connections from the justification keys to the pivotally mounted member to coöperate with the connections at the latter, the movements of the pivotally mounted member as the spaces are registered causing different sets of the connections thereto to be presented to the justification key connections, whereby finally upon actuation of the proper justification key, the amount of justification thereby represented is distributed to the number of spaces indicated by the movements of the pivotally mounted member, and the justification symbol for such distribution registered.

36. In a composing machine, character keys, keys representing the possible amounts of units of justification, means controlled from the keys for effecting the registration of character and justification symbols, the justification controlling means comprising a pivotally mounted member connected with the space key to be turned as the latter is actuated, and having arranged around it in sets, connections to the aforesaid controlling means for effecting the registration of the justification symbols, connections from the justification keys to the pivotally mounted member to coöperate with the connections at the latter, the movements of the pivotally mounted member as the spaces are registered causing different sets of connections to be presented to the justification key connections, whereby finally upon actuation of the proper justification key, the amount of justification thereby represented is distributed to the number of spaces indicated by the movements of the pivotally mounted member, and the justification symbol for such distribution registered.

37. In a composing machine, keys representing amounts of possible justification, means for effecting the registration of justification symbols, a rotary member having a collector, connections from the collector sections to the registering means, sets of electrical contacts around the rotary member, the several contacts of each of said sets of contacts being also connected to the several sections of the collector, and a space key and a connection therefrom to the rotary member for turning the latter when the space key is operated, a series of contacts controlled by the justification keys and so disposed with respect to the sets of contacts around the rotary member as to come into coöperative relation with one after another of said sets as the rotary member is turned, whereby upon operating a justifying key after a certain movement of the rotary member, the amount of justification represented by such key and the space distribution of the same are jointly registered.

38. In a composing machine, keys representing amounts of possible justification, means for effecting the registration of justification symbols, a rotary member, a collector connected to the registering means, said rotary member having on its surface sets of electrical contacts, the several contacts of each of said sets of contacts being connected to the several sections of the collector in combinations representative of the justification symbols, a space key, and a connection therefrom to the rotary member for turning the latter when the space key is operated, a series of contacts controlled by the justification keys and so disposed with respect to the sets of contacts on the rotary member as to come into coöperative relation with one after another of said sets as the rotary member is turned, whereby upon operation of a justifying key after a certain movement of the rotary member, the amount of justification represented by such key and the space distribution of the same are jointly registered.

39. In a composing machine, character keys, means for effecting registration of the character symbols, connections from each key to the registering means, and a switch for interchanging the connections between the keys and registering means.

40. In a composing machine, character keys, means for effecting registration of the character symbols, electrical connections from each key to the registering means, and a switch for interchanging the connections between the keys and registering means.

41. In a composing machine, character keys, means for effecting registration of the character symbols, connections from each key to the registering means, and means for interchanging any desired number of the connections between the keys and registering means.

42. In a composing machine, character keys, means for effecting registration of the character symbols, electrical connections from each key to the registering means, and means for interchanging any desired number of the connections between the keys and registering means.

43. In a composing machine, character keys, means for effecting registration of the character symbols, connections from each key to the registering means, and means for simultaneously interchanging any desired number of the connections between the keys and registering means.

44. In a composing machine, character keys, means for effecting registration of the character symbols, electrical connections from each key to the registering means, and means for simultaneously interchanging any desired number of the connections between the keys and registering means.

45. In a composing machine, a space key, a space register comprising a rotary member, connections from the key to the rotary member, means for registering the desired character and justification symbols on a record receiving member and connections from the space register to the symbol registering means.

46. In a composing machine, a space key, a space register comprising a rotary member, connections from the key to the rotary member, means for registering the desired character and justification symbols on a record receiving member and connections from the space register to the symbol registering means, said connections being controlled by the extent of movement of the space register.

47. In a composing machine, character keys, means for effecting the registration of symbols representative of characters, electrical connections from each of said keys to the registering means, such that upon operation of a key the corresponding character symbol is registered, and electrical connections including a set of plates insulated one from the other; pins fitting in holes in the plates and each in contact with one of said plates, but passing through and not contacting with others of the plates, said pins being severally connected to the elements of the registering mechanism, other groups of pins passing through said plates, each pin of each group being in contact with one of said plates and insulated from others, there being a group of such pins for each row of matrix characters, and connections from the several character keys of each matrix row to the several pins of the group corresponding to that row.

48. In a composing machine, means for effecting multiplex registrations or symbols, each multiplex registration being representative of an amount of justification distributed in units among the several spaces, one element of such registration representing the two sizes of spaces in the line, a second element representing the number of spaces of either of these two sizes, and a third element representing which of these two sizes of spaces shall precede in the line.

49. In a composing machine, means for effecting the registration of symbols representing the distribution or allotment of units of justification among word spaces and representing a greater allotment to some spaces than to others where an even distribution of units is not possible, means for effecting a registration to determine, in event of an uneven distribution of units to the spaces, whether the larger or the smaller allotments shall precede in the line.

50. In a composing machine, means for effecting the registration of symbols representing the distribution or allotment of units of justification among word spaces and representing a greater allotment to some spaces than to others where an even distribution of units is not possible, means controlling the register for determining what amounts of justification shall be registered as distributable among the spaces and means for controlling the register to determine in the event of uneven distribution, whether the larger allotment of units may either precede or succeed in the line, the smaller allotment.

51. In a composing machine, means for effecting the registration of symbols representing the distribution or allotment of units of justification among word spaces, and representing a greater allotment to some spaces than to others where an even distribution of units is not possible, means controlling the register for determining what amounts of justification shall be registered as distributable among the spaces and means controlling the register whereby in the event of uneven distribution the large allotment of units shall in some instances precede and in other instances succeed the smaller allotment.

52. In a composing machine, keys representing the total amounts of units of possible justification, means for effecting the registration of symbols representing the distribution or allotment in parts of such justification amounts among the several spaces, means intermediate the keys and the register controlling the production of symbols by the latter and so constructed that in some instances the symbol represents increasing, and in other instances decreasing, allotments of justification among the spaces along the line.

53. In a composing machine, keys representing the total amounts of units of possible justification, means for effecting the registration of symbols representing the distribution or allotment in units of such justification amounts among the several spaces, means intermediate the keys and the register controlling the production of symbols by the latter and so constructed that in some instances the symbol represents increasing, and in other instances decreasing, allotments of units among the spaces along the line.

54. In a composing machine, character keys, composite means for effecting the registration of symbols corresponding to said characters, electric circuits controlled by said keys, a bank of plates of conducting material insulated each from the others and tied together, means severally connecting said plates electrically to the various elements of said composite registering means, contact pins each of which is in the circuit of one of the character keys, said bank of plates being perforated to permit of the passage therethrough of said contact pins, said plates being so constructed that as the pins are passed therethrough each pin will make electrical contact with certain only of the plates, according to the lay-out of matrix employed; the assembled group of plates being removable as a whole from the pins to permit other assemblies of plates representative of other lay-outs to be substituted therefor on the pins.

55. In a composing machine, a character key-board means for effecting the registration of symbols representative of the characters, connections from the keys on the board to the register for operating the latter to effect registrations corresponding to the respective keys, and means for changing the registration effected by any key without changing the position or attachments of the key on the board.

56. In a composing machine, a character key-board, means for effecting the registration of symbols representative of the characters, electrical connections from the keys on the board to the register for operating the latter to effect registrations corresponding to the respective keys, and means for changing the registration effected by any key without changing the position or attachments of the key on the board.

57. In a composing machine, means for recording upon a tape, symbols representative of type characters, means for registering the unit value of the symbols so recorded and means connecting the several elements of the tape recording means with the several elements of the unit register whereby the proper number of units may be registered for each character recorded on the tape, and means for changing said connections to accord to any desired change in the matrix lay-out.

58. In a composing machine, means for recording upon a tape, symbols representative of type characters, means for registering the unit value of the symbols so recorded, and means connecting the several elements of the tape recording means with the several elements of the unit register whereby the proper number of units may be registered for each character recorded on the tape, and means for simultaneously changing a number of said connections to accord to any desired change in the matrix lay-out.

59. In a composing machine, means for recording upon a tape, symbols representative of type characters, means for registering the unit value of the symbols so recorded and means connecting the several elements of the tape recording means with the several elements of the unit register whereby the proper number of units may be registered for each character recorded on the tape, and means interposed between the tape recording means and the unit register for changing said connections to accord to any desired change in the matrix lay-out.

60. In a composing machine, means for recording upon a tape, symbols representative of type characters, means for registering the unit value of the symbols so recorded and means electrically connecting the several elements of the tape recording means with the several elements of the unit register whereby the proper number of units may be registered for each character recorded on the tape, and means for changing said electrical connections to accord to any desired change in the matrix lay-out.

61. In a composing machine, means for recording upon a tape, symbols representative of type characters, means for registering the unit value of the symbols so recorded and means electrically connecting the several elements of the tape recording means with the several elements of the unit register whereby the proper number of units may be registered for each character recorded on the tape, and a switch for changing said electrical connections to accord to any desired change in the matrix lay-out.

62. In a composing machine, means for recording upon a tape, symbols representative of type characters, means for registering the unit value of the symbols so recorded and means electrically connecting the several elements of the tape recording means with the several elements of the unit register whereby the proper number of units may be registered for each character recorded on the tape, and a switch for simultaneously changing a number of said electrical connections to accord to any desired change in the matrix lay-out.

63. In a composing machine, means for recording on a tape symbols representative of type characters, means for registering the unit value of the type characters as recorded, means for operating said register, and means interchangeably insertible into said register operating means to adjust the latter to changes in the unit value of characters in the matrix lay-out.

64. In a composing machine, a character key-board, means for recording on a tape symbols representative of the type characters, means for registering the unit value of the type characters as recorded on the tape, connections for the keys of the key-board to the unit register whereby there may be registered in the latter a number of units corresponding to the key operated, and means interchangeably insertible into said connections to adjust the latter to changes in the unit value of characters in the matrix lay-out.

65. In a composing machine, a character key-board, means for recording on a tape symbols representative of the type characters, means for registering the unit value of the type characters are recorded on the tape, connections for the keys of the key-board to the unit register whereby there may be registered in the latter a number of units corresponding to the key operated, and a switch in said connections to adjust the latter to changes in the unit value of characters in the matrix lay-out.

66. In a composing machine, a character key-board, means for recording on a tape symbols representative of the type-characters, means for registering the unit value of the type characters as recorded on the tape, connections for the keys of the key-board to the unit register whereby there may be registered in the latter a number of units corresponding to the key operated, and means controlling said connections to adjust the latter to changes in the unit value of characters in the matrix lay-out.

67. In a composing machine, a character key-board, means for recording on a tape symbols representative of the type characters, means for registering the unit value of the type characters as recorded on the tape, connections for the keys of the keyboard to the unit register whereby there may be registered in the latter a number of units corresponding to the key operated, and means simultaneously controlling a number of said connections to adjust the latter to changes in the unit value of characters in the matrix lay-out.

68. In a composing machine, type casting control means, a unit register, selecting means in connection with said control means and with said register, said unit register comprising an indicator, mechanism for differentially driving the indicator, a gear attached to one of said driven and driving elements, and a locking member carried by the other of said elements and having a finger to engage the teeth of said gear, said locking member having a movement in a plane perpendicular to the plane of said gear, and means for moving said locking member into engagement with said gear to lock said driven and driving elements.

69. In a unit register for composing machines, an indicating surface having divisions or notations thereon to represent units of set measurement of type characters and spaces, an indicator needle and mechanism for differentially driving the needle over the indicating surface, a gear attached to one of said driven or driving elements, said gear having less teeth than there are unit divisions on said indicating surface, two or more locking members carried by the other of said driven or driving elements, means for forcing one or another of said locking members into interlocking engagement with the teeth of the gear, the locking members being positioned one from the other a distance unevenly divisible by the mean distance between two adjacent teeth on the gear, the positioning of the locking members being such that the gear may be locked by one or another of said members with the indicator needle at any required division on the indicating surface.

70. In a unit register for composing machines, an indicating surface having divisions or notations thereon to represent units of set measurement of type characters and spaces, an indicator needle and mechanism for differentially driving the needle over the indicating surface, said driving mechanism carrying a toothed disk or gear, said gear having less teeth than there are unit divisions on said indicating surface, a plurality of locking members, means for forcing one or another of said locking members into interlocking engagement with the teeth of the gear, the locking members being positioned one from the other a distance unevenly divisible by the mean distance between two adjacent teeth of the gear, the positioning of the locking members being such that the gear may be locked by one or the other of said members with the indicator needle at any required division on the indicating surface.

71. In a composing machine, type casting control means, a unit register, selecting means in connection with said control means and with said register, said unit register comprising an indicator, mechanisms for differentially driving said indicator, and means for preventing back-lash or effects of momentum of said driving mechanism.

72. In a composing machine, type casting control means, a unit register, selecting means in connection with said control means and with said register, said unit register comprising an indicator, mechanism for driving the indicator, a pawl and ratchet in said driving mechanism, means for returning the pawl to an initial position after each impulse of the driving mechanism, and means adapted to be moved into engagement with the indicator after each impulse thereof to hold the indicator in the position to which it has been fed while the pawl returns preparatory to the next feed.

73. In a composing machine, type casting control means, a unit register, selecting means in connection with said control means and with said register, said unit register comprising an indicator, mechanism for driving the indicator and means for locking the indicator fixedly between the several feeds thereof.

74. In a unit register for composing machines, a surface having demarcations to denote units of set width of type characters and spaces, and an indicating member movable relatively to the surface over the demarcations thereon during the composing of a line and any portion thereof, the demarcations being numbered progressively in one direction whereby the number of units in any composed part of the line may be determined from the relative position of indicating surface and member, said demarcations being numbered progressively in the reverse direction at the end of the line whereby the number of units of necessary justification may be determined when the indicating member reaches that part of the surface.

75. In a unit register for composing machines, two dials or unit indicating surfaces, the surface of each having demarcations denoting units of set width of type characters and spaces, an indicating member movable relatively to said surfaces around the same, the demarcations on said surfaces being numbered clockwise and anti-clockwise, respectively, whereby the readings on one of said surfaces indicate the number of units of composition recorded and the readings on the other surface, the number of units of composition to be recorded in any line or section thereof.

76. In a unit register for composing machines, two dials or unit indicating surfaces, the surface of each having demarcations denoting units of set width of type characters and spaces, an indicating member movable relatively to said surfaces around the same, the demarcations on said surfaces being numbered clockwise and anti-clockwise, respectively, whereby the readings on one of said surfaces indicate the number of units of composition recorded and the readings on the other surface, the number of units of composition to be recorded in any line or section thereof, and means for setting said dials or surfaces in a plurality of positions with respect to each other.

77. In a unit register for composing machines, two dials or unit indicating surfaces, the surface of each having demarcations denoting units of set width of type characters and spaces, an indicating member movable relatively to said surfaces around the same, the demarcations on said surfaces being numbered clockwise and anti-clockwise, respectively, whereby the readings on one of said surfaces indicate the number of units of composition recorded and the readings on the other surface, the number of units of composition to be recorded in any line or section thereof, and means for turning one of said surfaces with respect to the other to cause any reading thereon to register with any desired reading on the other surface.

78. In a unit register, an indicating surface having demarcations thereon to denote units of set width of type characters and spaces, an indicating member coöperating with said surface, means for moving said member and surface relatively from an initial position as the characters and spaces are recorded, and means whereby the initial relative setting of said surface and member may be varied at will.

79. In a unit register, an indicating surface having demarcations thereon to denote units of set width of type characters and spaces, an indicating member adapted to be moved over said surface from an initial position as the characters and spaces are recorded, said surface being adjustable, whereby any desired initial reading of the movable member may be had.

80. In a unit register, an indicating surface having demarcations thereon to denote units of set width of type characters and spaces, an indicating member adapted to be moved over said surface from an initial position as the characters and spaces are recorded, means for driving said member differentially over said surface, and means for returning said member to its initial position, means for stopping said member at its initial position on its return movement, and means whereby said indicating surface may be moved into any adjusted set position with respect to said stop.

81. In a composing machine, a unit register comprising an indicating surface having demarcations thereon to indicate units of set measurements of type characters and spaces, a member differentially movable with respect to said surface from an initial position as the characters and spaces are recorded, means for recording a number of justifications in one line, and means for returning the indicating member to its initial position with respect to the surface each time a justification is recorded in the line.

Signed by us at New York city, county and State of New York, this 20 day of February 1908.

WILLIAM NICHOLAS.
WILLIAM ACKERMAN.

Witnesses:
J. F. WOODWORTH,
EMMA W. RENNÉ.